US009298299B2

(12) United States Patent
Ludden

(10) Patent No.: US 9,298,299 B2
(45) Date of Patent: Mar. 29, 2016

(54) MULTI-SENSOR TOUCH INTEGRATED DISPLAY DRIVER CONFIGURATION FOR CAPACITIVE SENSING DEVICES

(71) Applicant: Synaptics Incorporated, San Jose, CA (US)

(72) Inventor: Christopher A. Ludden, Pittsford, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 190 days.

(21) Appl. No.: 14/219,996

(22) Filed: Mar. 19, 2014

(65) Prior Publication Data

US 2015/0091849 A1 Apr. 2, 2015

Related U.S. Application Data

(60) Provisional application No. 61/885,999, filed on Oct. 2, 2013.

(51) Int. Cl.
*G06F 3/041* (2006.01)
*G06F 3/044* (2006.01)
*G09G 5/00* (2006.01)

(52) U.S. Cl.
CPC .............. *G06F 3/0412* (2013.01); *G06F 3/044* (2013.01); *G09G 5/00* (2013.01)

(58) Field of Classification Search
CPC ....... G06F 3/041; G06F 3/0412; G06F 3/044; G09G 3/30–3/3291; G09G 3/36–3/3696; G09G 5/00; G09G 2300/0408; G09G 2300/0421–2300/0434; G09G 2310/0264–2310/0275
See application file for complete search history.

(56) References Cited

U.S. PATENT DOCUMENTS

| 8,514,185 | B2 | 8/2013 | Hotelling | |
|---|---|---|---|---|
| 2004/0239650 | A1 | 12/2004 | Mackey | |
| 2006/0097976 | A1* | 5/2006 | Lee | G06F 3/0412 345/98 |
| 2008/0309627 | A1 | 12/2008 | Hotelling et al. | |
| 2010/0014222 | A1* | 1/2010 | Hsu | G09G 3/34 361/679.01 |
| 2010/0144391 | A1 | 6/2010 | Chang et al. | |

(Continued)

FOREIGN PATENT DOCUMENTS

EP 2280483 A1 2/2011

OTHER PUBLICATIONS

International Search Report dated Dec. 31, 2014 for Application No. PCT/US2014/056002.

(Continued)

*Primary Examiner* — Nathan Danielsen
(74) *Attorney, Agent, or Firm* — Patterson + Sheridan, LLP

(57) ABSTRACT

Embodiments of the disclosure generally provide an integrated control system having an integrated controller that is configured to provide both display updating signals to a display device and a capacitive sensing signal to a sensor electrode that is disposed within the integrated input device. The internal and/or external signal routing configurations described herein can be adapted to reduce signal routing complexity typically found in conventional devices and reduce the effect of electrical interference created by the capacitive coupling formed between the display routing, capacitive sensing routing and/or other components within the integrated control system. Embodiments can also be used to reduce electromagnetic interference (EMI) on the display and touch sensing signals received, transmitted and processed within the integrated control system.

21 Claims, 11 Drawing Sheets

(56) References Cited

U.S. PATENT DOCUMENTS

| | | |
|---|---|---|
| 2010/0194695 A1 | 8/2010 | Hotelling et al. |
| 2010/0194698 A1 | 8/2010 | Hotelling et al. |
| 2010/0253638 A1 | 10/2010 | Yousefpor et al. |
| 2012/0038585 A1 | 2/2012 | Kim |
| 2012/0098776 A1 | 4/2012 | Chen et al. |
| 2012/0218199 A1 | 8/2012 | Kim et al. |
| 2013/0016065 A1 | 1/2013 | Reynolds et al. |
| 2013/0176281 A1 | 7/2013 | Hotelling et al. |
| 2013/0215075 A1 | 8/2013 | Lee et al. |
| 2013/0321296 A1 | 12/2013 | Lee et al. |
| 2014/0184313 A1* | 7/2014 | Chuang .............. G06F 3/044 327/517 |

OTHER PUBLICATIONS

Alan Rich; "Shielding and Guarding", How to Exclude Interference-Type Noise. Analog Devices. 1983.

U.S. Appl. No. 14/067,792, filed Oct. 30, 2013.

U.S. Appl. No. 14/042,661, filed Sep. 30, 2013.

* cited by examiner

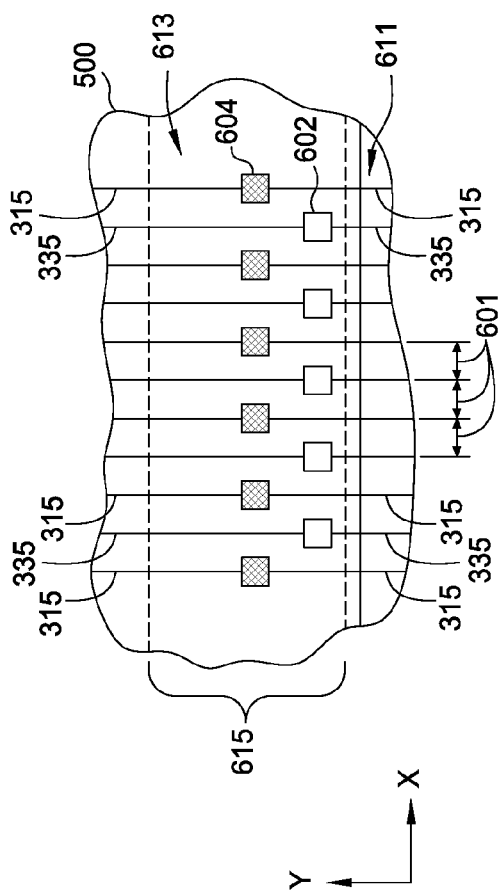
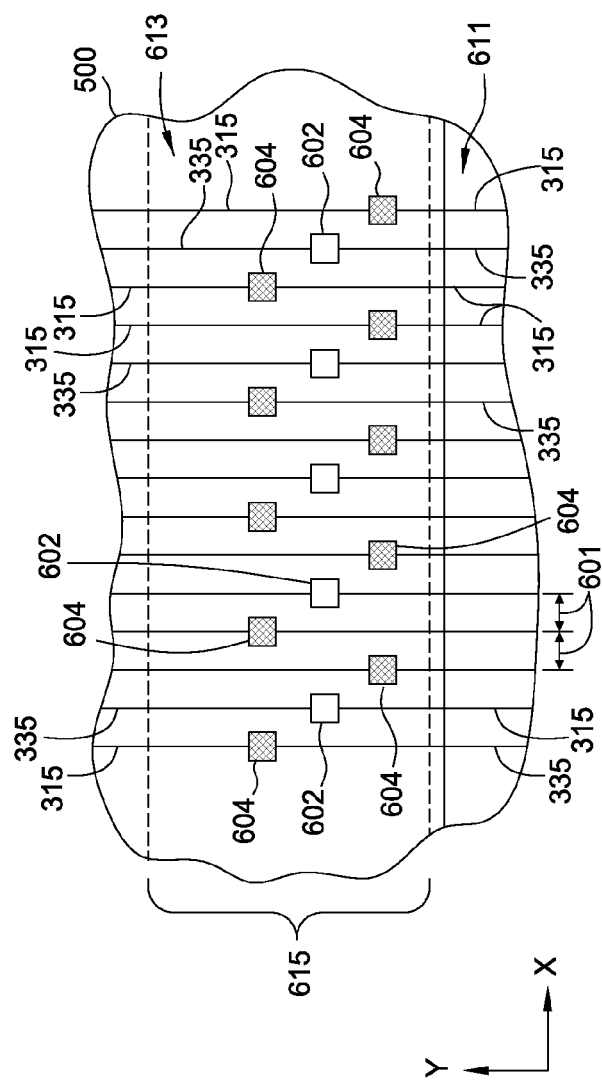

MULTI-SENSOR TOUCH INTEGRATED DISPLAY DRIVER CONFIGURATION FOR CAPACITIVE SENSING DEVICES

CROSS-REFERENCE TO RELATED APPLICATIONS

This application claims benefit of U.S. provisional patent application Ser. No. 61/885,999, filed Oct. 2, 2013, which is hereby incorporated herein by reference.

BACKGROUND OF THE INVENTION

1. Field of the Invention

Embodiments of the present invention generally relate to a system and method for sensing a position of an input object over a sensing region of a proximity sensing device.

2. Description of the Related Art

Input devices including proximity sensor devices, also commonly called touchpads or touch sensor devices, are widely used in a variety of electronic systems. A proximity sensor device typically includes a sensing region in which the proximity sensor device determines the presence, location and/or motion of one or more input objects, such as a finger. Proximity sensor devices may be used to provide interfaces for an electronic system. For example, proximity sensor devices are often used as input devices for larger computing systems, such as opaque touchpads integrated in, or peripheral to notebook or desktop computers. Proximity sensor devices are also often used in smaller computing systems, such as touch screens integrated in cellular phones. Proximity sensor devices are typically used in combination with other supporting components, such as display or input devices found in the electronic or computing system.

In some configurations, the proximity sensor devices are coupled to these supporting components to provide a desired combined function or to provide a desirable complete device package. Many commercially available proximity sensor devices utilize one electrical technique to determine the presence, location and/or motion of an input object, such as a capacitive or a resistive sensing technique. Typically, a capacitive sensing type of proximity sensor device utilizes an array of sensor electrodes and traces to detect the presence, location and/or motion of an input object. A trace is an electronic component that connects an electrode region within a sensor electrode to the controlling electronics found in the proximity sensor device.

Also, typically proximity sensor devices are integrated with display generating components to form a touch integrated display device, such as a touch screen for a desktop computers, a touch screen for a laptop computer, netbook computers, tablets, web browsers, e-book readers, personal digital assistants (PDAs), smart phones and other similar electronic devices. The display circuitry that is used to update the pixels within the display generate an electrical signal that will interfere with the signals flowing through the traces and sensor electrodes that form part of the capacitive sensing circuitry used to sense the position of an input object. Therefore, it is common to physically separate the display circuitry from the capacitive sensing circuitry to minimize the electrical interference and interaction of the signals flowing through these different types of circuits.

However, with the advent of new touch sensing technologies that include the use of absolute and transcapacitive sensing techniques, the number of sensor electrodes required to perform the touch sensing process has greatly increased, which has also greatly increased the number of traces that need to be routed to the controlling electronics within the touch sensing device. Since it is typical to physically separate the capacitive sensing circuitry from the display updating circuitry, the capacitive sensing circuitry will typically be disposed at the edges of any integrated circuit (IC) chip that contains these two types of electrical circuits to allow the traces used for touch sensing to be routed around or within the border region (i.e., unusable area) of the display panel. Due to the large number of routing traces required for the absolute and/or transcapacitive sensing techniques, the borders of the display need to become excessively large. Alternately, in some cases manufactures will resort to separating the display updating circuitry and the capacitive sensing circuitry into separate IC chips, which greatly increases the piece part and manufacturing cost of the touch sensing device.

Therefore, there is a need for an apparatus and method of forming and using a proximity sensing device that is configured to solve the problems described above. The proximity sensing device also should be inexpensive to produce and be formed so that it can be integrated within a desirably sized electronic system.

SUMMARY OF THE INVENTION

Embodiments of the disclosure generally provide an integrated control system having an integrated controller that is configured to provide both display updating signals to a display device and a capacitive sensing signal to a sensor electrode that is disposed within the input device. The internal and/or external signal routing configurations described herein can be adapted to reduce signal routing complexity typically found in conventional devices and reduce the effect of electrical interference created by the capacitive coupling formed between the display routing, capacitive sensing routing and/or other components within the integrated control system. Embodiments can also be used to reduce electromagnetic interference (EMI) on the display and touch sensing signals received, transmitted and processed within the integrated control system.

Embodiments of the disclosure provide a control system for use in an input device, comprising an integrated controller comprising display circuitry coupled to a plurality of source driver output pads, wherein the source driver output pads are used for updating a display within the input device, and capacitive sensing circuitry coupled to a plurality of capacitive sensing pads that are configured to transfer a capacitive sensing signal during a capacitive sensing operation performed by the input device, wherein at least one of the plurality of capacitive sensing pads is disposed between two source driver output pads.

Embodiment of the disclosure may further provide an integrated control system for use in an input device, comprising an integrated controller comprising display circuitry coupled to a plurality of source driver output pads, wherein the source driver output pads are configured to transfer a display updating signal to a display within the input device, and capacitive sensing circuitry coupled to a plurality of capacitive sensing pads that are configured to transfer a capacitive sensing signal during a capacitive sensing operation performed by the input device. The plurality of capacitive sensing pads and the driver output pads can be arranged in an order in a first direction, and the order includes at least one of the plurality of capacitive sensing pads that is disposed between two second source driver output pads.

Embodiment of the disclosure may further provide an integrated control system for use in an input device, comprising an integrated controller comprising display circuitry coupled to a plurality of source driver output pads, wherein the source driver output pads are configured to transfer a display updating signal to a display within the input device, and capacitive sensing circuitry coupled to a plurality of capacitive sensing pads that are configured to transfer a capacitive sensing signal during a capacitive sensing operation performed by the input device. The plurality of capacitive sensing pads and the driver output pads can be arranged in a pattern that has a pitch having a pitch length in a first direction. The pattern may include at least one of the plurality of capacitive sensing pads that is disposed one pitch length from a first source driver output pad in the first direction and at least one pitch length from a second source driver output pad in a direction opposite to the first direction.

Embodiment of the invention may further provide an input device comprising a plurality of sensor electrodes disposed in an array on a surface of a first layer of a display device, and an integrated controller coupled to the plurality of sensor electrodes via a plurality of conductive routing wires in a second layer of the integrated input device. The integrated controller may further comprise a display circuitry coupled to a plurality of source driver output pads, wherein the source driver output pads are coupled to display updating components within the integrated input device via a plurality of conductive routing wires in the second layer, and a capacitive sensing circuitry coupled to a plurality of capacitive sensing pads that are configured to transfer a capacitive sensing signal to the plurality of sensor electrodes during a capacitive sensing operation performed by the input device. The plurality of capacitive sensing pads and the plurality of source driver output pads can be arranged in a pattern that has a pitch having a pitch length in a first direction. The pattern may include at least one of the plurality of capacitive sensing pads that is disposed one pitch length from a first source driver output pad in the first direction and at least one pitch length from a second source driver output pad in a direction opposite to the first direction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6B is a schematic plan view of a portion of the integrated controller illustrated in FIG. 6A, according to one or more of the embodiments described herein.

FIG. 6C is a schematic plan view of a portion of the integrated controller illustrated in FIG. 6A, according to one or more of the embodiments described herein

Figure 1:
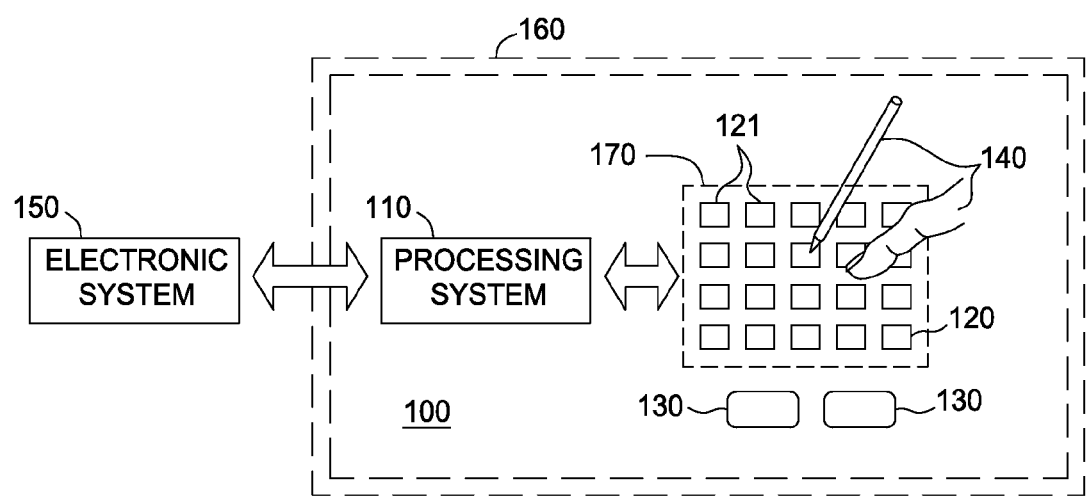
FIG. 1 is a schematic block diagram of an exemplary input device, in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

General Overview

Embodiments of the disclosure provided herein generally provide an integrated control system having an integrated controller that is configured to provide both display updating signals to display electrodes disposed within a display pixel within a display device and a capacitive sensing signal to a sensor electrode that is disposed within an input device. The integrated control system is generally configured to work with a variety of integrated capacitive sensing and display applications, for example, in-cell display device configurations, on-cell display device configurations or any other similar display device configurations. Therefore, by use of internal and/or external signal routing configurations the integrated control system is adapted to reduce signal routing complexity typically found in conventional devices and reduce the effect of capacitive coupling between the display routing, capacitive sensing routing and/or other components within the integrated control system. Embodiments can also be used to reduce electromagnetic interference (EMI) on the display and touch sensing signals received, transmitted and processed within the integrated control system. The integrated control system can thus reduce system complexity and lower production cost of the input device.

As the sizes of display devices, touch pads and other similar devices increase, the need for an integrated control system that is able to maintain or even improve the touch sensing accuracy without greatly increasing the manufacturing cost and size becomes increasingly important. Embodiments of the disclosure may provide an integrated control system that is configured to update a display and perform both absolute and transcapacitive sensing techniques within the input device. Accordingly, the embodiments of the invention can be used to reduce the size and cost of existing integrated control system designs and minimize the size and costs required to produce the next generation devices.

System Overview

FIG. 1 is a schematic block diagram of an input device 100 integrated into an exemplary display device 160, in accordance with embodiments of the present technology. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as datan input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include 120, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

Figure 2A:
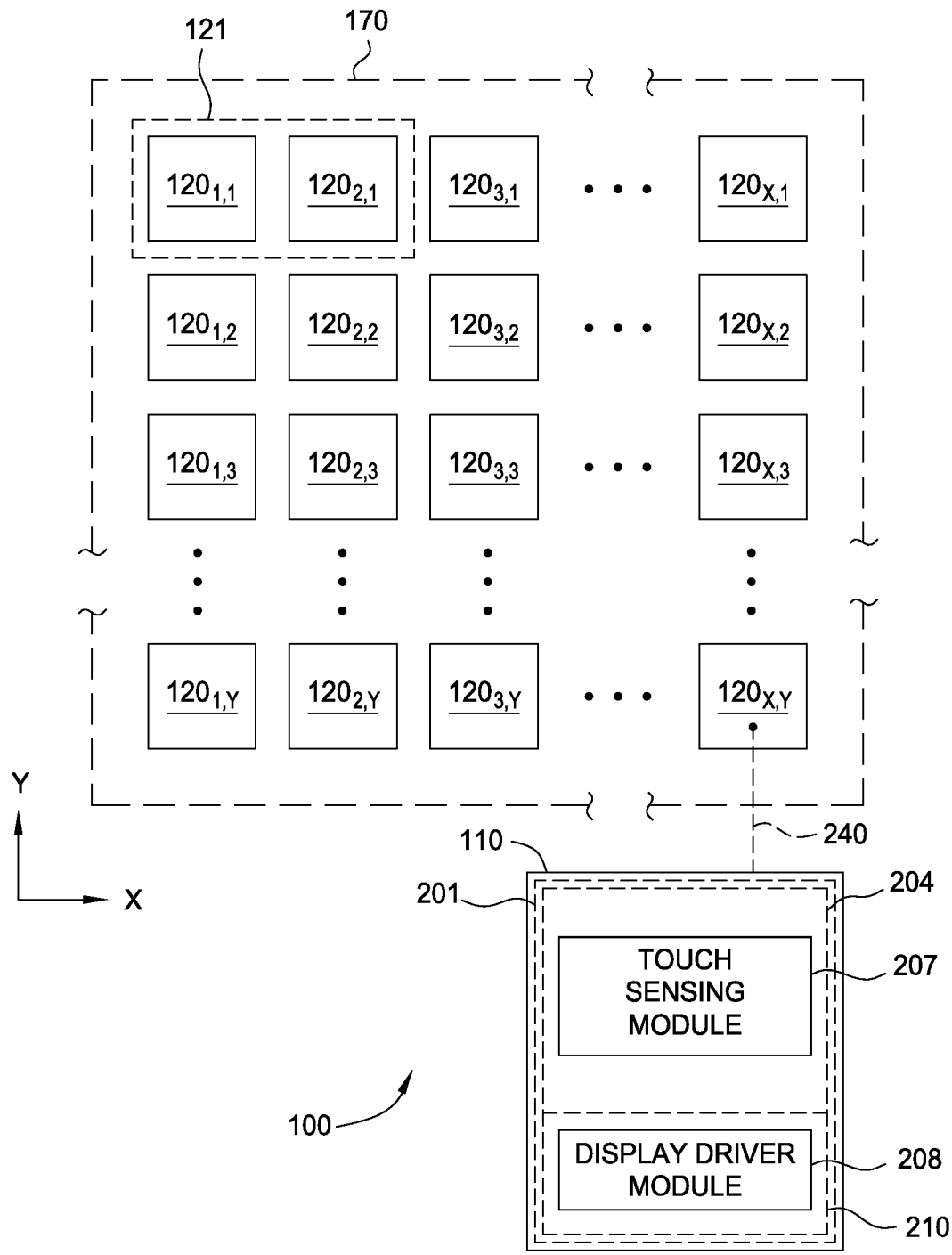
FIG. 2A is a schematic diagram illustrating an input device, according to one or more of the embodiments described herein.

The input device 100 may utilize any combination of sensor components and sensing technologies to detect user input in the sensing region 170. The input device 100 comprises a plurality of sensing elements 121 that each includes one or more sensor electrodes 120 for detecting user input, which are discussed further below. In one example, the sensing elements 121 each include two or more sensing electrodes 120, as illustrated in FIG. 2A. In another example, the sensing elements 121 each include a single sensing electrode 120. As several non-limiting examples, the input device 100 may use capacitive, elastive, resistive, inductive, magnetic acoustic, ultrasonic, and/or optical techniques. Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Sensing elements 121 in some capacitive implementations utilize arrays or other regular or irregular patterns of capacitive sensing electrodes 120 to create electric fields that are used to sense the position of an input object over the sensing element(s) 121. In some capacitive implementations, separate sensing electrodes 120 may be ohmically shorted together to form larger sensor electrodes. Some capacitive implementations utilize resistive sheets, which may be uniformly resistive.

Figure 2B:
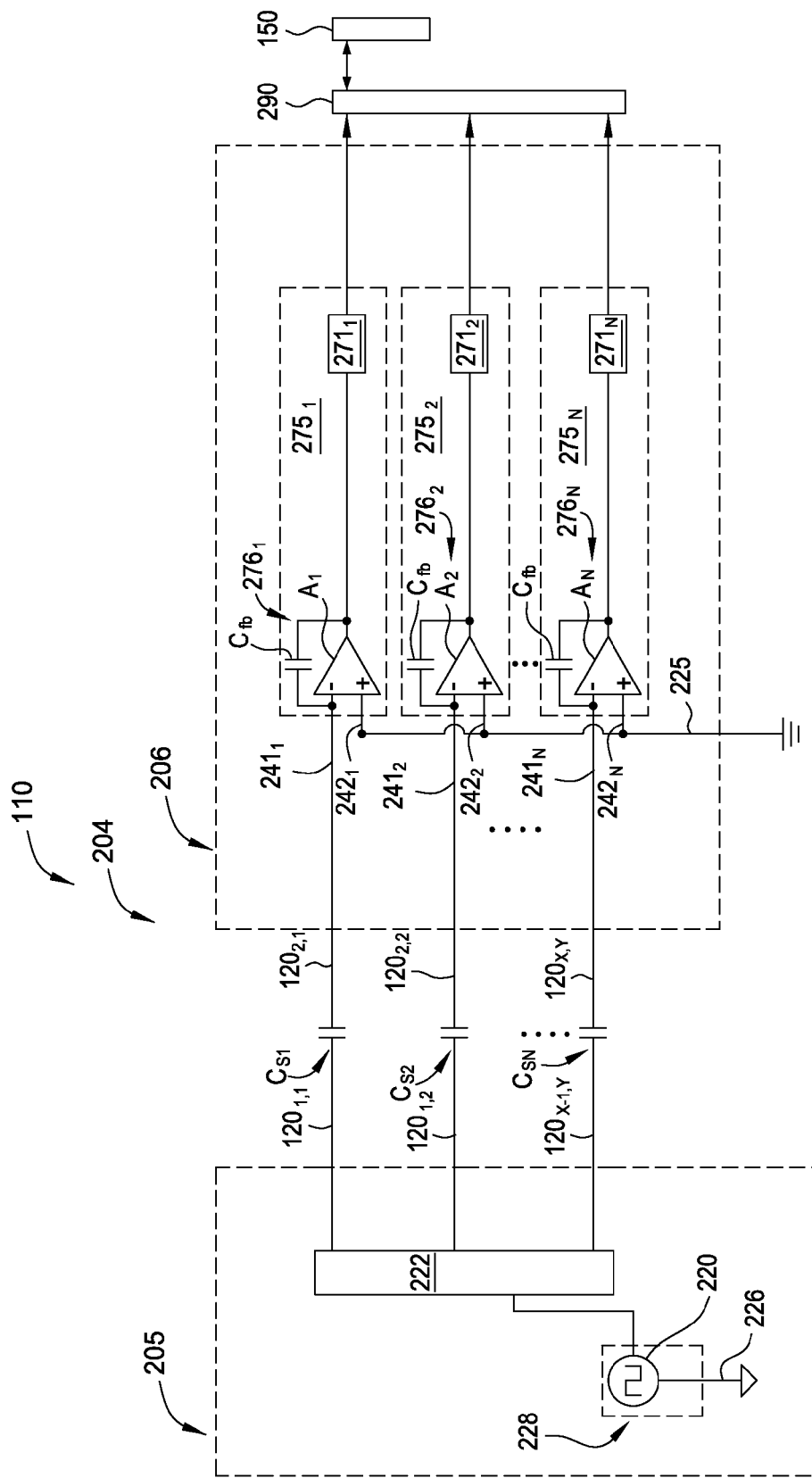
FIG. 2B is a schematic diagram illustrating a portion of an input device, according to one or more of the embodiments described herein.
Figure 2C:
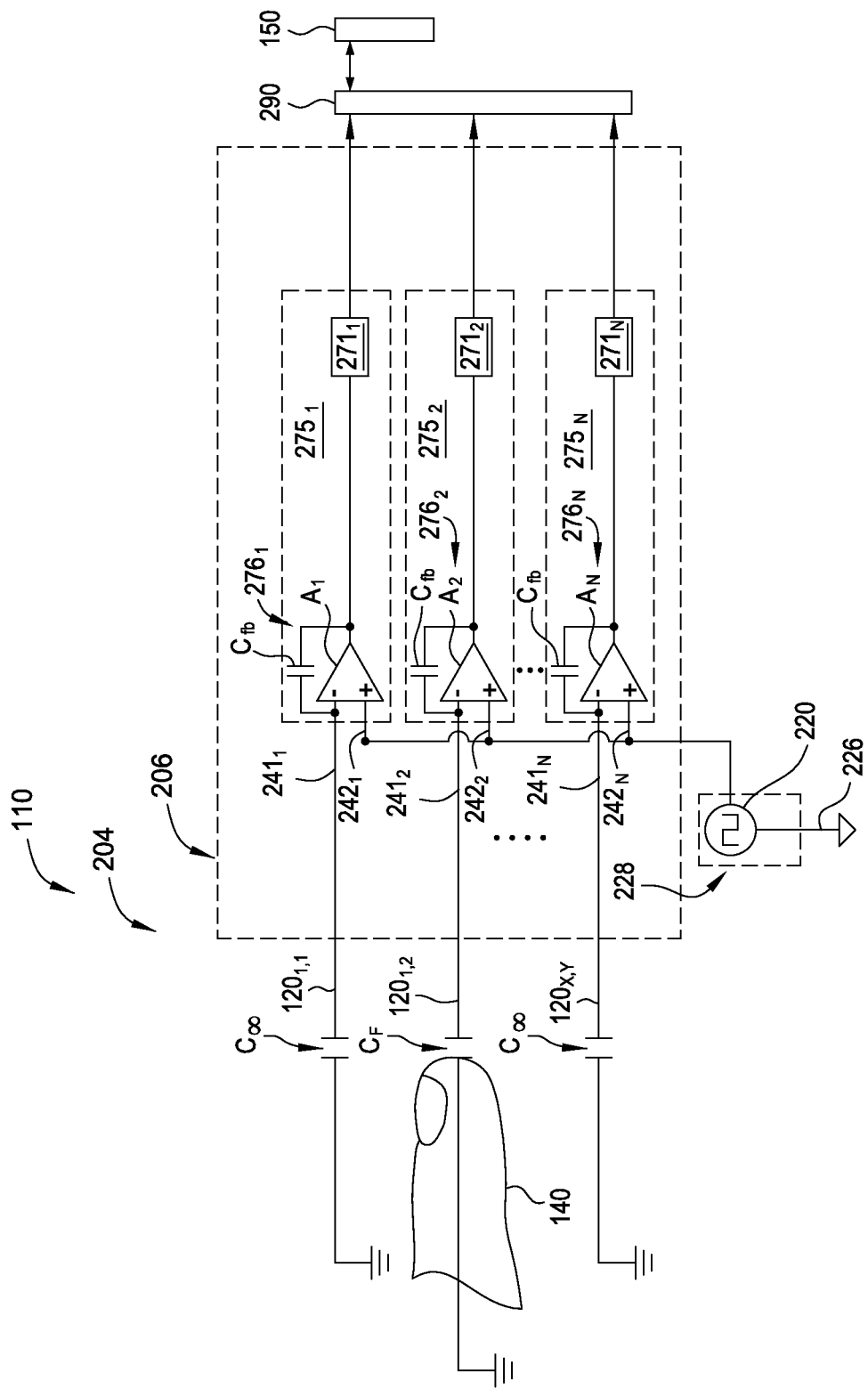
FIG. 2C is a schematic diagram illustrating a portion of an input device, according to one or more of the embodiments described herein.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, as illustrated in FIG. 2C, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, as illustrated in FIG. 2B, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signal. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing electrodes 120 found in the sensing elements 121 of the input device 100. In other embodiments, components of processing system 110 are physically separate with one or more components close to sensing electrodes 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data, such as sensor signals and positional information, and reporting modules for reporting information. Further example modules include sensor operation modules configured to operate sensing elements 121 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing elements 121 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

FIG. 2A is a schematic block diagram of a portion of the input device 100 illustrated in FIG. 1 in accordance with the disclosure provided herein. The illustrated portion of the input device 100 includes an array of sensing electrodes 120 that are coupled to an integrated control system 201 that is formed within the processing system 110 via a connection 240. FIG. 2A shows a portion of an exemplary pattern of sensing electrodes 120 configured to sense in the sensing region 170 associated with the pattern, according to some embodiments. For clarity of illustration and description, the sensor electrodes 120 are illustrated in a pattern of simple rectangles and does not show various other components. The exemplary pattern comprises an array of sensor electrodes $120_{X,Y}$ (referred collectively as sensor electrodes 120) arranged in X columns and Y rows, wherein X and Y are positive integers. It is contemplated that the pattern of sensing electrodes 120 may comprises a plurality of sensor electrodes 120 having other configurations, such as polar arrays, repeating patterns, non-repeating patterns, non-uniform arrays, a single row or column, or other suitable arrangement. Further, the sensor electrodes 120 may be any shape such as circular, rectangular, diamond, star, square, non-convex, convex, non-concave, concave, etc. The sensor electrodes 120 are coupled to the processing system 110 and utilized to determine the presence (or lack thereof) of an input object 140 in the sensing region 170. The sensor electrodes 120 are typically ohmically isolated from each other. That is, one or more insulators separate the sensor electrodes 120 and prevent them from electrically shorting to each other.

In one mode of operation, or first operation mode, at least a portion of the arrangement of sensor electrodes 120 (e.g., sensor electrodes $120_{1-1}$, $120_{1-2}$, $120_{1-3}$, ... $120_{X-Y}$) may be utilized to detect the presence of an input object via absolute sensing techniques. That is, processing system 110 is configured to drive each sensor electrode 120 with a modulated signal and measure a capacitance between the electrode 120 and the input object (e.g., free space or earth ground) based on the modulated signal, which is utilized by the processing system 110 or other processor to determine the position of the input object.

In another mode of operation, or second operation mode, at least a portion the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal includes effects corresponding to the transmitter signal. The resulting signal is utilized by the processing system 110 or other processor to determine the position of the input object. The groups of sensor electrodes 120 thus form a plurality of sensing elements 121 that comprises one or more transmitter electrodes and one or more receiver electrodes that can be disposed within one or more layers of the display device 160. For clarity of drawing reasons, only one example of a sensing element 121 is illustrated in FIG. 2A. In one configuration of the display device 160, each of the sensing elements 121 comprise one or more transmitter electrodes that are disposed proximate to one or more receiver electrodes. In one example, a transcapacitive sensing method using the single layer sensor electrode design, may operate by detecting the change in capacitive coupling between one or more of the driven transmitter sensor electrodes and one or more of the receiver electrodes, as similarly discussed above.

The input device 100 may be configured to operate in any one of the modes described above. The input device 100 may also be configured to switch operation between any two or more of the modes described above.

The areas of localized capacitance (capacitive coupling) may be termed "capacitive pixels." Capacitive pixels may be formed between an individual sensor electrode 120 within a sensing element 121 and ground in the first mode of operation and between groups of sensor electrodes 120 within a sensing element 121 used as transmitter and receiver electrodes in the second mode of operation. The capacitive coupling changes with the proximity and motion of input objects 140 in the sensing region 170 associated with the sensing elements 121, and thus may be used as an indicator of the presence of the input object in the sensing region of the input device 100. A set of measurements from the capacitive pixels form a "capacitive image" (also "capacitive frame") representative of the capacitive couplings at the pixels.

In some embodiments, the sensor electrodes 120 are "scanned" to determine these capacitive couplings. That is, in one embodiment, in a particular time interval one subset of the sensor electrodes 120 is driven, and in a different time interval a second subset of the sensor electrodes 120 is driven. In the second mode of operation, the transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes 120 configured as receiver sensor electrodes may be operated singly or multiply to acquire resulting signals. The resulting signals may be used to determine measurements of the capacitive couplings at the capacitive pixels.

In other embodiments, "scanning" sensor electrodes 120 to determine these capacitive couplings comprises driving with a modulated signal and measuring the absolute capacitance of one or more of the sensor electrodes. In another embodiment, the sensor electrodes may be operated such that more than one sensor electrode is driven at a time. In such embodiments, an absolute capacitive measurement may be obtained from each of the one or more sensor electrodes 120 simultaneously. In one embodiment, the input device 100 simultaneously drives a plurality of the sensor electrodes 120 and measures an absolute capacitive measurement for each of the driven electrodes 120 in the same sensing cycle. In various embodiments, processing system 110 may be configured to selectively drive and receive with a portion of sensor electrodes 120. For example, the sensor electrodes may be selected based on, but not limited to, an application running on the host processor, a status of the input device, an operating mode of the sensing device and a determined location of an input object.

In some touch screen embodiments, one or more of the sensor electrodes 120 comprise one or more display electrodes used in updating the display of the display screen. In one or more embodiment, the display electrodes comprise one or more segments of a Vcom electrode (common electrodes), a source drive line, gate line, an anode electrode, a cathode electrode, or any other display element. These display electrodes may be disposed on an appropriate display screen substrate. For example, the common electrodes may be disposed on the transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over or under an emissive layer (OLED), etc. In such embodiments, the common electrode can also be referred to as a "combination electrode", since it performs multiple functions. In various embodiments, each of the sensor electrodes 120 comprises one or more common electrodes.

Continuing to refer to FIG. 2A, the processing system 110 coupled to the sensing electrodes 120 includes an integrated control system 201 that includes capacitive sensing circuitry 204 and display circuitry 210. In one embodiment the capacitive sensing circuitry 204 comprises a touch sensing module 207 that includes circuitry configured to drive transmitter signals or modulated signals onto one or more of the sensing electrodes 120 and receive resulting signals with one or more of the sensing electrodes 120 during periods in which input sensing is desired. In one configuration, the touch sensing module 207 includes elements that are configured to perform absolute sensing and/or transcapacitive sensing processes.

In one embodiment of the integrated control system 201, the capacitive sensing circuitry 204 includes a transmitter module 205 (FIG. 2B) that includes circuitry configured to drive a transmitter signal onto the sensing electrodes 120 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 170. The modulated signal used in absolute capacitive sensing may be the same or different from the transmitter signal used in transcapacitive sensing. The capacitive sensing circuitry 204 may be selectively coupled one or more of the sensor electrodes 120. For example, the capacitive sensing circuitry 204 may be coupled to selected portions or to all of the sensor electrodes 120 in the sensing region 170, and operate in either an absolute or transcapacitive sensing mode.

In various embodiments the capacitive sensing circuitry 204 may comprise a receiver module 206 (FIG. 2B) that includes circuitry configured to receive a resulting signal with the sensing electrodes 120. In the second mode of operation, the received resulting signal includes effects corresponding to a transmitter signal generated by a transmitter electrode during periods in which input sensing is desired. In one or more embodiments, the receiver module 206 is configured to drive a modulated signal onto a sensor electrode 120 and receive a resulting signal corresponding to the modulated signal to determine changes in absolute capacitance of the sensor electrode 120, as discussed further below in conjunction with FIG. 2C. The receiver module 206 may determine a position of the input object 140 in the sensing region 170 or may provide a signal including information indicative of the resulting signal to another module or processor, for example, a determination module or a processor of the electronic system 150 (i.e., a host processor), for determining the position of the input object 140 in the sensing region 170. In one or more embodiments, the receiver module 206 comprises a plurality of receivers that form part of an analog front end (AFE).

FIG. 2B is a schematic view of a portion of the processing system 110 used to perform the second operation mode (e.g., transcapacitance mode), according to one or more of the embodiments described herein. In one configuration, the processing system 110 includes a transmitter module 205 and a receiver module 206 that work together to provide input sensing data to a determination module 290 and/or to the electronic system 150. The determination module 290 may be part of the processing system 110 and/or part of the electronic system 150. In various embodiments, the determination module 290 will comprises digital signal processing elements and/or other useful digital and analog circuit elements that are connected together to process the receiver channel output signal(s) received from at least one receiver channel that is coupled to a receiver electrode, and also provide processed signals to other portions of the electronic system 150. The electronic system 150 can then use the processed signals to control some aspect of the processing system 110, such as send a message to the display, perform some calculation or software related task based on instructions created by one or more software programs that are being run by the electronic system and/or perform some other function.

While operating in the second operation mode, the transmitter module 205 and receiver module 206 will generally work together to provide receiver channel output signals to the determination module 290 and/or the electronic system 150. As discussed above, the positional information of an input object 140 (FIG. 1) is derived based on the capacitance Cs (e.g., capacitance $C_{S1}$, $C_{S2}$, ... $C_{SN}$) measured between each of the transmitter electrodes (e.g., sensor electrodes $120_{1,1}$, $120_{1,2}$, ... $120_{X-1,Y}$) and the receiver electrodes (e.g., sensor electrodes $120_{2,1}$, $120_{2,2}$, ... $120_{X,Y}$), wherein N is a positive integer.

In one embodiment, as shown in FIG. 2B, the transmitter module 205 comprises one or more drivers 228, which are adapted to drive the transmitter electrodes. In one configuration, each driver 228 may comprise a power supply and signal generator 220 that is configured to deliver a square, rectangular, trapezoidal, sinusoidal, Gaussian or other shaped waveforms used to form the transmitter signal(s) to the transmitter electrodes. In one configuration, the signal generator 220 comprises an electrical device, or simple switch, that is able to deliver a transmitter signal that transitions between the output level of the power supply and a low display voltage level. In various embodiments, signal generator 220 may comprise an oscillator. In some configurations, the signal generator 220 is integrated into the driver 222, which includes one or more shift registers (not shown) and/or switches (not shown) that are adapted to sequentially deliver transmitter signals to one or more of the transmitter electrodes at a time.

In one embodiment, the receiver module 206, or also referred to herein as the analog front end (AFE), comprises a plurality of receiver channels 275 (e.g., receiver channels $275_1, 275_2, \ldots 275_N$) that each have a first input port 241 (e.g., ports $241_1, 241_2, \ldots 241_N$) that is configured to receive the resulting signal received with at least one receiver electrode (e.g., sensor electrodes $120_{2,1}, 120_{2,2}, 120_{X,Y}$), a second input port (e.g., ports $242_1, 242_2, \ldots 242_N$) that is configured to receive a reference signal delivered through the line 225, and an output port coupled to the determination module 290 and electronic system 150. In some configurations, the line 225 can be biased to a desired potential to form a virtual ground. Typically, each receiver channel 275 is coupled to a single receiver electrode. Each of the plurality of receiver channels 275 may include a charge accumulator 276 (e.g., charge accumulators $276_1, 276_2, \ldots 276_N$), supporting components 271 (e.g., components $271_1, 271_2, \ldots 271_N$) such as demodulator circuitry, a low pass filter, sample and hold circuitry, other useful electronic components, filters and analog/digital converters (ADCs) or the like. The analog/digital converter (ADC) may comprise, for example, a standard 8, 12 or 16 bit ADC or a Successive Approximation ADC, a Sigma-Delta ADC, an Algorithmic ADC, etc. that is adapted to receive an analog signal and deliver a digital signal (receiver channel output signal) to the determination module 290. In one configuration, each charge accumulator 276 includes an integrator type operational amplifier (e.g., Op Amps $A_1$-$A_N$) that has an integrating capacitance $C_{fb}$ that is coupled between the inverting input and the output of the device.

FIG. 2C is a schematic view of a portion of the processing system 110 used to perform the first operation mode (e.g., absolute capacitance mode), according to one or more of the embodiments described herein. In one configuration, the processing system 110 includes a receiver module 206 that includes a driver 228 that is configured to indirectly drive the sensor electrodes 120 to provide absolute sensing type touch sensing data to a determination module 290 and the electronic system 150. In one example, when measuring absolute capacitance, a input port 241 (e.g., traces $241_1$-$241_N$) may be coupled to one of the sensor electrodes 120 (e.g., traces $120_{1,1}$-$120_{X,Y}$). During the sensing cycle, a positive terminal on an integrator (e.g., a charge accumulator $276_1$-$276_N$) in the receiver module 206 may be driven with the modulated signal. The negative terminal on the integrator may be coupled to the input port 241 and to a feedback loop of the integrator through a feedback capacitor. Based on modulating the positive terminal, the receiver module 206 measures a capacitance between the sensor electrode 120 coupled to the input port 241 and an input object 140. Using this measurement, a touch sensing module 207 may determine if an input object 140 is proximate to the sensor electrode 120. In various embodiments, the determination module 290 will comprise digital signal processing elements and/or other useful digital and analog circuit elements that are connected together to process the receiver channel output signal(s) received from at least one receiver channel that is coupled to a sensor electrode 120, and may also provide processed signals to other portions of the electronic system 150. The electronic system 150 can then use the processed signals to control some aspect of the processing system 110, such as send a message to the display, perform some calculation or software related task based on instructions created by one or more software programs that are being run by the electronic system and/or perform some other function.

While operating in the first operation mode, the positional information of an input object 140 (FIG. 1) is derived based on the amount of charge flowing through the circuit, due to the increase in capacitance $C_F$ created by the presence of the input object 140 near the receiver electrodes 120 (e.g., sensor electrodes $120_{1,2}$). Thus, the measured capacitance $C_F$ will have a different measured value than the stray capacitance $C_\infty$ formed between the other sensor electrodes and ground.

During operation, in one or more embodiments, capacitive sensing (or input sensing) and display updating may occur during at least partially overlapping periods. For example, as a common electrode is driven for display updating, a different common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as one display line update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times.

Referring back to FIG. 2A, the display circuitry 210 may include a display driver module 208 that includes circuitry configured to provide display image update information to the display of the display device 160 during non-sensing (e.g., display updating) periods. The display driver module 208 may be included with or separate from the capacitive sensing circuitry 204. In one embodiment, the processing system comprises a first integrated controller comprising the display driver module 208 and at least a portion of the capacitive sensing circuitry 204 (i.e., transmitter module 205 and/or receiver module 206). In another embodiment, the processing system comprises a first integrated controller comprising the display driver module 208 and a second integrated controller comprising the capacitive sensing circuitry 204. In yet another embodiment, the processing system comprises a first integrated controller comprising a display driver module 208 and one of a transmitter module or a receiver module and a second integrated controller comprising the other one of the transmitter module and receiver module.

Dual-Gate Line Routing

Figure 3:
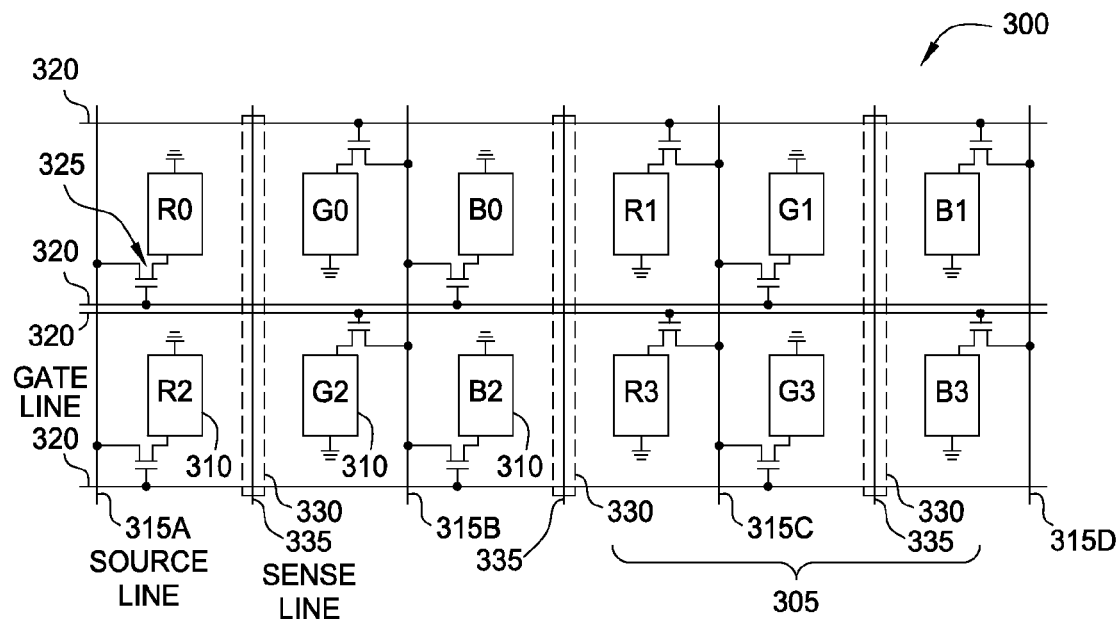
FIG. 3 is a schematic diagram illustrating a portion of a display circuitry that shares a subpixel data line between two sub-pixels, according to one embodiment described herein.

FIG. 3 illustrates a display device 300 where two sub-pixels 310 share the same subpixel data line 315. In one example, the components of the display device 300 described herein may be used in an LCD display device or an OLED display device. As used herein, a pixel 305 is a combination of monochromatic sub-pixels 310 (e.g., red, green and blue) that are combined to define the combined color of the pixel 305. Thus, the portion of the display device 300 illustrated in FIG. 3 includes four pixels 305 that each include three sub-pixels 310. To change the color of the sub-pixels 310, and thus, change the color of the pixel 305, the display device 300 includes gate lines 320, which are used to activate one or more of the sub-pixels 310 in a particular row in the display device 300. For example, the display device 300 may activate one of the gate lines 320 at a time (e.g., sequentially) which activates only the switching elements 325 (e.g., transistors) in the row that are connected to the activated gate line 320. In parallel, the display device 300 may drive the desired voltage for the sub-pixels 310 onto the subpixel data lines 315. The sub-pixels are shown coupled to ground, but this may be any reference voltage (e.g., Vcom) used to set the voltage across the sub-pixels 310. Because the other gate lines 320 deactivate the switching elements 325 they are coupled to, the voltages on the subpixel data lines 315 do not affect the sub-pixels 310 coupled to the deactivated switches 325.

In display device 300, some or all of the subpixel data lines 315 are used to set the voltage on at least two sub-pixels 310 on the same row. For example, subpixel data line 315B sets the voltage on sub-pixel G0 and B0. To do so, the display device 300 may drive the subpixel data lines 315 twice as fast in order to update a row in the same amount of time needed if the subpixel data lines 315 were not shared by sub-pixels 310 in the same row. This technique is referred to herein as a dual-gate arrangement where two gates lines 320 are used in order to alternately activate every other sub-pixel 310 in a row. During the first half of a display row update, a first gate line 320 activates every other switching element 325 in the row to update the corresponding sub-pixels 310 (e.g., sub-pixels G0, R1 and B1 are electrically coupled to the sources lines 315B, 315C, and 315D). During the second half of the display row update, a second gate line 320 activates the other half of the switching elements 325 in the row to update the rest of the sub-pixels 310 (e.g., sub-pixels R0, B0, and G1 are electrically coupled to the sources lines 315A, 315B, and 315C). In this manner, the gate lines 320 and subpixel data lines 315 may be synchronized to ensure the correct voltages are driven onto the sub-pixels 310. Although the dual-gate arrangement may drive the source and gate lines 315, 320 twice as fast in order to maintain the same display rate, the number of subpixel data line drivers is halved.

Reducing the number of subpixel data lines 315 using the dual-gate arrangement frees up the routing channels 330. That is, if the dual-gate arrangement was not used, these routing channels 330 would be occupied by subpixel data lines 315. Instead, the display device 300 may place conductive routing traces 335 in the routing channels 330. As will be discussed later, the display device 300 may include a plurality of different layers. That is, the pixels 305, gate lines 320, subpixel data lines 315, and switching elements 325 may be located on two or more different layers that are stacked to form the display device 300. Because the layer that includes the subpixel data lines 315 now has the free routing channels 330, these free regions may be used to add the traces 335 to the display device 300. The traces 335 may then be coupled to the sensor electrodes 120 discussed in FIG. 2A. Specifically, the traces 335 may be used to carry the capacitive sensing signals (e.g., the modulated signal when performing absolute capacitive sensing or the transmitter/resulting signals when performing transcapacitive sensing) to and from the sensor electrodes 120. Advantageously, this routing of signals may be performed within the free channel regions 330, and thus, avoid adding a different layer to the display device 300.

Sensor Electrode Arrangement Examples

Figure 4A:
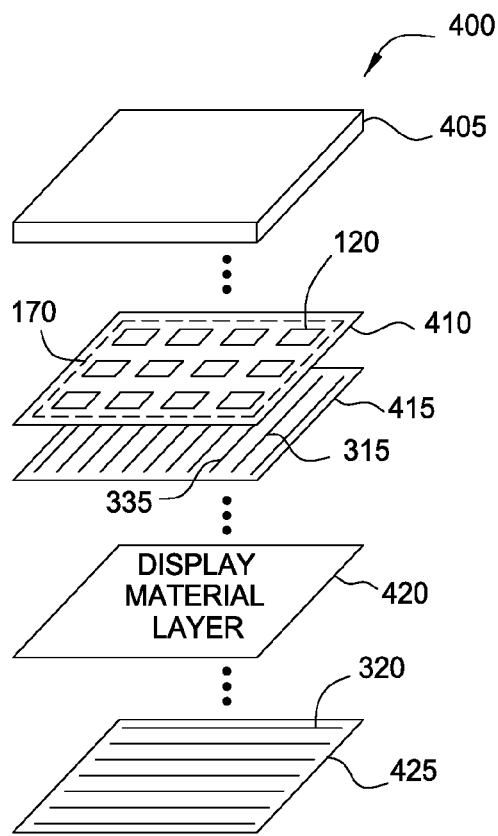
FIG. 4A illustrates an integrated input device with a sensing region, according to one embodiment described herein.
Figure 4B:
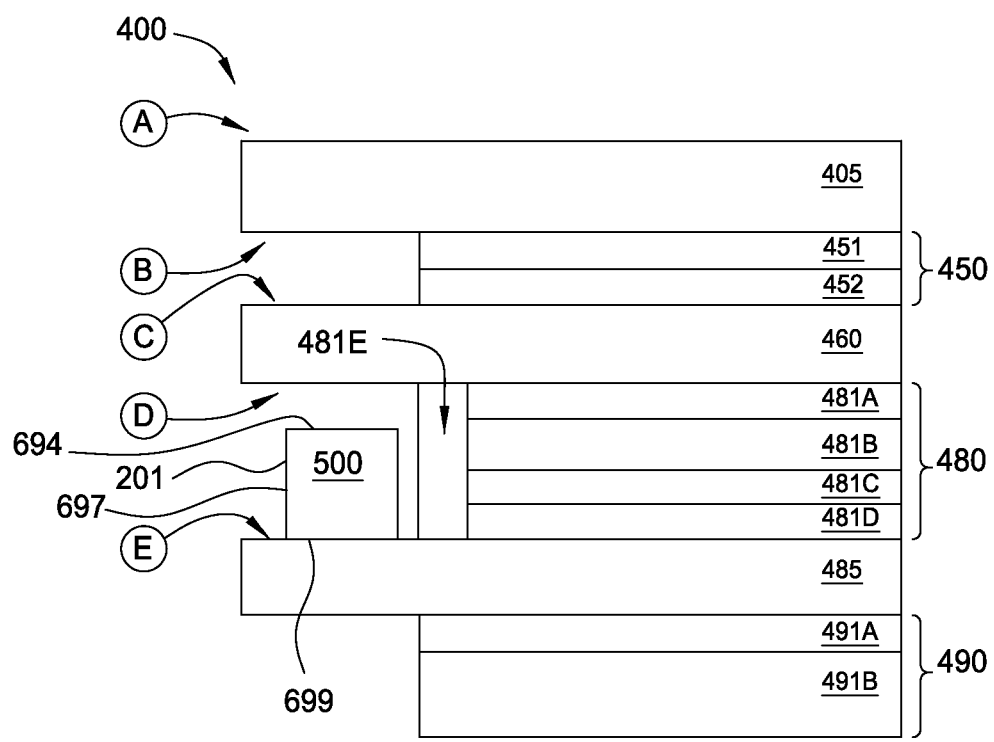
FIG. 4B is a schematic partial side cross-sectional view of a portion of an integrated input device, according to one embodiment described herein.

FIG. 4A illustrates an integrated input device 400 with a sensing region 170, according to one embodiment described herein. FIG. 4B is a schematic partial side cross-sectional view of a portion of an LCD type of an integrated input device 400, according to one embodiment described herein. The integrated input device 400 may include some or all of the components found within the input device 100 and display device 300, which are discussed above. To facilitate understanding, identical reference numerals have been used, where possible, to designate identical elements that are common between these figures and the ones that follow. Integrated input device 400 includes a first substrate 405 which may serve as an outer layer of the integrated input device 400. The first substrate 405 may be formed from a transparent material, such as a glass material, a plastic material or a polymer material. In one embodiment, first substrate 405 may be a protective upper layer of the integrated input device 400. Although not shown, additional layers may be added onto the first substrate 405 when manufacturing an integrated input device.

Layer 410 may include transparent sensor electrodes 120 which are used to determine an input object's position within the sensing region 170. As such, the capacitive sensing elements used to detect the proximity of an input object relative to the integrated input device 400 may be integrated within a portion of the integrated input device 400 or be disposed on top of the integrated input device 400. Layer 410 may be directly beneath the first substrate 405 or one or more layers may separate the first substrate 405 and layer 410 within the integrated input device 400, as further discussed below in conjunction with FIG. 4B.

In some embodiments, layer 410 may be used when updating the display and when performing capacitive sensing—i.e., the sensing electrodes 120 are common electrodes as described above. In one embodiment, the sensing electrodes 120 include all the common electrodes in the layer 410. During display updating, the electrodes 120 may be coupled to the sub-pixels 310 shown in FIG. 3 to serve as the reference voltage (e.g., ground or Vcom) when setting the voltage across the sub-pixels 310. During capacitive sensing, however, the capacitive sensing signals may be driven onto the electrodes 120 in order to detect input objects. In one embodiment, layer 410 may be a Vcom layer that is patterned into the electrodes 120 in order to serve the dual purpose described above. In other embodiments, the electrodes 120 may be integrated into other layers of the integrated input device 400, e.g., such as the layer that forms the gate electrodes.

While not shown in FIG. 4A, integrated input device 400 may include respective vias that couple the traces 335 on subpixel data line layer 415 to one of the electrodes 120 in layer 410. In one example, the subpixel data lines 315 and traces 335 can be connected to one or more of the LCD display elements 480 (FIG. 4B) using a plurality of conductive vias that extend through one or more of the sub-layers. In one example, the TFT circuits and display pixels 305 are formed in the TFT layer 481D (FIG. 4B) and the subpixel data lines 315, which are positioned within the conductive layer of the first sub-layer, are coupled to the TFT layer 481D elements using conductive vias that extend through the first sub-layer. While FIG. 4A illustrates that the subpixel data line layer 415 directly contacts layer 410, this is not a requirement. For example, the vias may extend through multiple layers in order to electrically connect the traces 335 to the electrodes 120.

In one configuration, the pixels, subpixels, gate lines, subpixel data lines, and/or switching elements, as discussed above in conjunction with FIG. 3, may be located on two or more different layers of the TFT substrate, or third substrate 485 (FIG. 4B), that are stacked to form part of the integrated input device 400. The third substrate 485 includes a plurality of sub-layers (not shown) that include an insulating layer and a conductive layer, and is also referred to herein as the TFT substrate 485. The conductive material in the conductive layer can be patterned to form one or more conductive traces, such as the subpixel data lines 315 and traces 335. In some configurations, the integrated input device 400 includes a subpixel data line layer 415 (FIG. 4A), which routes the various subpixel data lines 315 for driving voltages onto the subpixels in the integrated input device 400. Thus, in one example, the subpixel data line layer 415 may be formed within a first sub-layer of the third substrate 485 or the TFT layer 481D. As shown, subpixel data line layer 415 also includes the traces 335 which may be interleaved with the subpixel data lines 315.

Display material layer 420, illustrated in FIG. 4A, may include the pixels 305 shown in FIG. 3. That is, the material used to form the subpixels (e.g., liquid crystal, emissive electroluminescent material, etc.) may be placed on layer 420. As such, the integrated input device 400 may include vias that couple the subpixels in layer 420 to the subpixel data lines 315 in subpixel data line layer 415.

Integrated input device 400 may include a gate line layer 425 which includes a plurality of gate lines 320 for electrically coupling the subpixel data lines 315 to the subpixels in the display material layer 420. As such, integrated input device 400 may include vias that couple the gate lines 320 to switching elements (not shown) in the display material layer 420, which may be formed within one of the sub-layers. Moreover, the various layers, as well as their order, shown in FIG. 4A are for illustration purposes only and are not intended to limit the different integrated input devices which may be used with the embodiments presented herein. For example, the integrated input device 400 may include more or less than the layers shown, or the integrated input device 400 may order the layers differently.

While the description below primarily discusses, with primary reference to FIG. 4, one type of LCD display, this configuration is not intended to be limiting as to the scope of the invention described herein in, since one or more of the embodiments described herein could also be used with other types of LCD devices (e.g., IPS devices), organic light emitting diode (OLED) display configurations or other similar display configurations.

Some embodiments of the integrated input device 400 may include a first transparent substrate, a second transparent substrate, and a third substrate. The first transparent substrate may be configured to be located closer to users' eyes during use, and in some cases may be a lens, or sometime referred to as the window glass. The second transparent substrate is located between the first transparent substrate and the third substrate. The third substrate may carry an active layer configured to change the electric field. The third substrate may be a TFT substrate and the active layer may be a TFT layer. The integrated control system 201 may be communicatively coupled to the third substrate, mounted to the third substrate and/or located remotely from the third substrate. In general, the sensor electrodes 120, which are not shown in FIG. 4B, are typically disposed at or near one or more of the positions A-E within the integrated input device 400.

In some embodiments, the integrated input device 400 may include the first substrate 405, an optical element layer 450, a second substrate 460, LCD display elements 480, a third transparent substrate 485 and a backlight module 490. The LCD display elements 480 may comprise a color filter layer 481A, an optional common electrode layer 481B, a liquid crystal containing layer 481C, a TFT layer 481D and a gasket 481E, which is used to encapsulate the various layers found in the LCD display elements 480. In one embodiment, as shown in FIG. 4B, the first substrate 405 is a cover substrate, the second substrate 460 is a color filter substrate, the third substrate 485 is a TFT substrate, and the integrated control system 201 is mounted to a surface of the third substrate 485. In another embodiment, as shown in FIG. 4B, the first substrate 405 is a cover substrate, the second substrate 460 is a color filter substrate, the third substrate 485 is a TFT substrate, and the integrated control system 201 is mounted to a surface of the second substrate 460. In one configuration, the optical element layer 450 includes polarizer film layer 451 and anti-shatter layer 452. The backlight module 490 may comprised a polarizing layer 491A and a backlight device 491B, which delivers light to the LCD display elements 480.

In some configuration, not shown herein, the integrated input device 400 may not contain a separate common electrode layer 481B. Thus, in some configurations, the common electrodes may be disposed within the TFT layer 481D. In this case, the LCD display elements 480 will only include a color filter layer 481A, a liquid crystal containing layer 481C, a TFT layer 481D and gasket 481E, and the TFT layer 481D will contain the display pixels 305 and common electrodes previously found in the common electrode layer 481B. This type of integrated input device 400 configuration is commonly known as an in-plane switching (IPS), fringe field switching (FFS) or plane line switching (PLS) LCD device. In various embodiments, one or more sensor electrodes (may or may not comprise a substantially opaque material) may be patterned and or rotationally aligned on the color filter glass in order to reduce the visual effect of the patterned sensor electrodes on the luminance of the integrated input device (e.g., the subpixels).

In some other configurations of the input device 400, a transparent conductive oxide (TCO) layer is deposited on either surface of the second substrate 460 for the purpose of mitigating the effects of electrostatic discharge or accumulated surface charges on the layers above it. The formed TCO layer could also be segmented and used to form the sensor electrodes.

Display and Sensor Electrode Configuration Examples

In one embodiment of the integrated input device 400, the sensor electrodes 120 may be arranged on different sides of the same substrate. Referring to FIG. 4B, in some configurations the sensor electrodes 120 may be positioned on the first substrate 405 at positions A and/or B or positioned on the second substrate 460 at positions C and/or D. Each of the sensor electrode(s) 120 may extend longitudinally across one of the surfaces of a substrate disposed within the integrated input device 400. Further still, on one side of the substrate, the sensor electrodes 120 may extend in a first direction, but on the other side of the substrate, the sensor electrodes 120 may extend in a second direction that is either parallel, perpendicular or at an angle to the first direction. For example, the sensor electrodes 120 may be shaped as bars or stripes where the electrodes 120 on one side of the substrate extend in a direction perpendicular to the sensor electrodes 120 on the opposite side of the substrate.

In one configuration, the sensor electrodes 120 may also be formed on different substrates that are then laminated together. In one example, a first portion of the sensor electrodes 120 may be positioned on the first substrate 405 at positions A or B and a second portion of the sensor electrodes 120 may be positioned on the second substrate 460 at positions C or D. In another example, a first portion of the sensor electrodes 120 may be positioned on the second substrate 460 at positions C or D and a second portion of the sensor electrodes 120 may be positioned on the third substrate 485 at position E. In yet another example, a first portion of the sensor electrodes 120 may be positioned on the second substrate 460 at positions A, B, C or D and a second portion of the sensor electrodes 120 may be positioned on the third substrate 485 at position E. During operation, a first plurality of the sensor electrodes 120 disposed on one of the substrates may be used to transmit a sensing signal (i.e., transmitter electrodes) while a second plurality of the sensor electrodes 120 disposed on the other substrate are used to receive resulting signals (i.e., receiver electrodes). In other embodiments, the first and/or second plurality of sensor electrodes may be driven as absolute capacitive sensor electrodes.

In another configuration, the sensor electrodes 120 are all located on the same side or surface of a common substrate. In one example, a first plurality of the sensor electrodes comprise jumpers in regions where the first plurality of sensor electrodes crossover the second plurality of sensor electrodes, where the jumpers are insulated from the second plurality of sensor electrodes. Referring to FIG. 4B, in some configurations, all of the sensor electrodes 120 may be positioned on the first substrate 405 at positions A or B, positioned on the second substrate 460 at positions C or D or positioned on the third substrate 485 at position E. In one example, the sensor electrodes 120 may be disposed between the third substrate 485 (i.e., TFT substrate) and the second substrate (e.g., color filter glass) of the integrated input device 400. In one embodiment, a first plurality of sensor electrodes are disposed on the TFT substrate, each comprising one or more common electrodes and a second plurality of sensor electrodes may be disposed between the color filter glass and the TFT substrate. Specifically, the receiver electrodes may be routed within the black mask, which may be part of the color filter layer 481A, on the color filter glass. In another embodiment, all of the sensor electrodes 120 comprise one or more common electrodes. The sensor electrodes 120 may be located entirely on the TFT substrate or the color filter glass as an array of electrodes. As discussed above, some of the sensor electrodes 120 may be coupled together in the array using jumpers or all the electrodes 120 may be electrically isolated in the array and use grid electrodes to shield or guard the sensor electrodes 120. In one more embodiment, the grid electrodes, when present, comprise one or more common electrodes.

In another embodiment, the sensor electrodes 120 are all located on the same side or surface of the common substrate. In such embodiments, the sensor electrodes 120 are electrically isolated from each other. In one embodiment, the electrodes 120 are disposed in a matrix array where each sensor electrode 120 is substantially the same size and/or shape. In such embodiment, the sensor electrodes 120 may be referred to as a matrix sensor electrode. In some cases, when used in an absolute sensing mode each sensor electrode of the matrix array may correspond to a pixel of the capacitive image. Thus, in some embodiments, the processing system 110 is configured to drive the sensor electrodes 120 with a modulated signal to determine changes in absolute capacitance via a measured resulting signal. Alternately, in some cases, the processing system 110 is also configured to drive a transmitter signal onto a first one of the sensor electrodes 120 and receive a resulting signal with a second one of the sensor electrodes 120. The driven sensor electrode 120 and receiving sensor electrode in this case are general considered to be a pixel of a capacitive image. The transmitted signal(s) and modulated signal(s) in transcapacitive and absolute sensing modes may be similar in at least one of shape, amplitude, frequency and phase. In various embodiments, the transmitter signal(s) and modulated signal(s) are the same signal. In various embodiments, one or more grid electrodes may be disposed on one or more of the substrates and between the sensor electrodes 120, where the grid electrode(s) may be used to shield and guard the sensor electrodes.

Integrated Controller Configuration Examples

Figure 5:
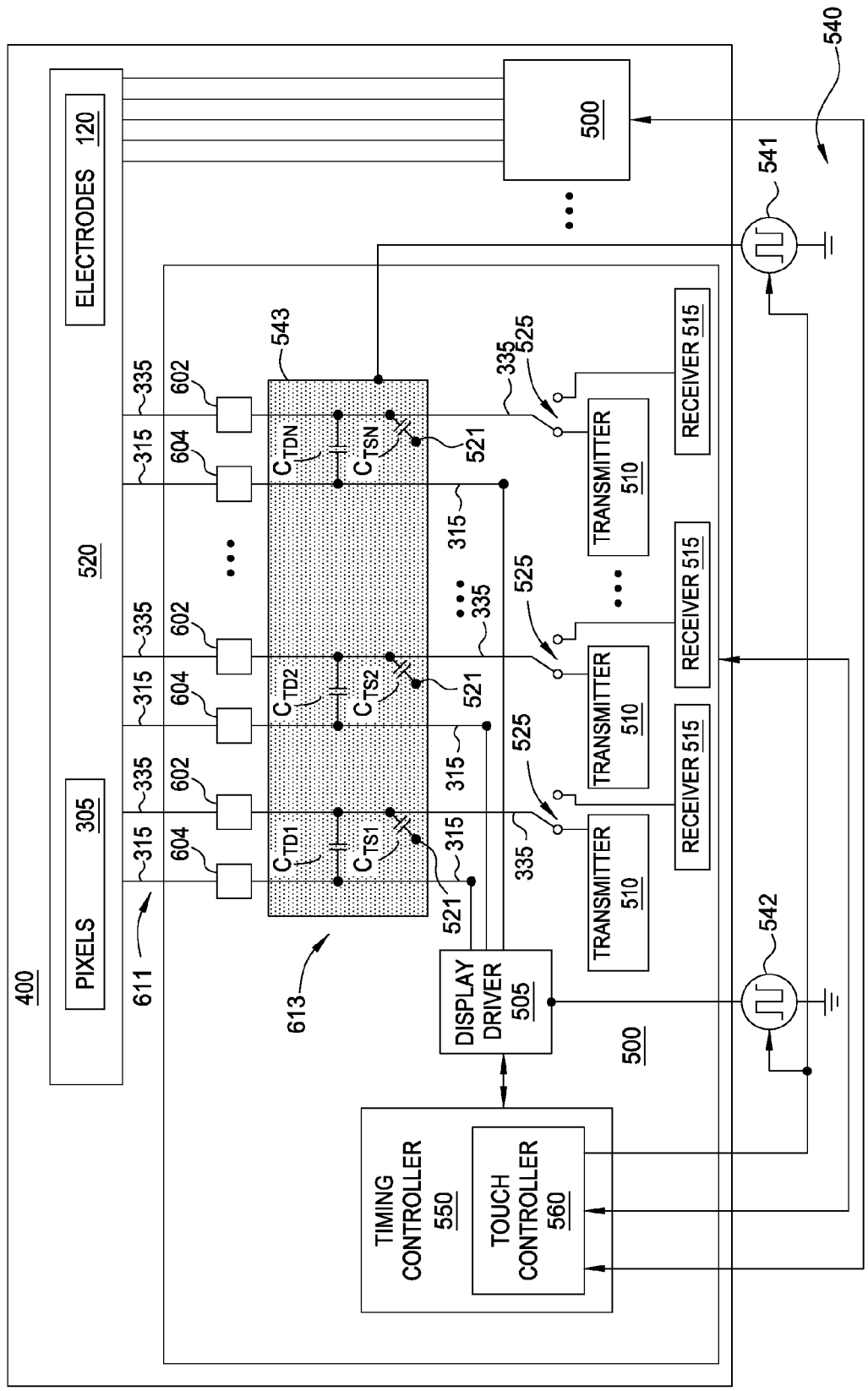
FIG. 5 illustrates an integrated input device that has one or more integrated controllers disposed within an integrated input device for performing display updating and capacitive sensing, according to one embodiment described herein.

FIG. 5 is a schematic view of an input device 100 having one or more integrated controllers 500 that are formed within the integrated control system 201 of the integrated input device 400 for performing display updating and capacitive sensing, according to one embodiment described herein. In general, the one or more integrated controllers 500 contain the display circuitry and capacitive sensing circuitry that are part of the integrated control system 201. In one configuration, an integrated controller 500 may comprise an IC chip that comprises multiple layers of patterned conductive and dielectric layers that are formed on a semiconductor substrate (e.g., crystalline silicon substrate) to form the various discrete semiconductor devices used to form the integrated control system 201. The one or more integrated controllers 500 may be directly mounted to a portion of the integrated input device 400. For example, the integrated controllers 500 may be attached to the first substrate 405 shown in FIG. 4A or the third substrate 485, as shown in FIG. 4B. While the input device 400 may include multiple integrated controllers 500, in some embodiments, only one integrated controller 500 may be used.

The integrated controller 500 includes display driver 505 that contains the display circuitry used to drive the sources lines 315 for updating the voltage stored across the pixels 305 in a display and capacitive sensing region 520 of the integrated input device 400. The display and capacitive sensing region 520 generally includes the sensing region 170 that overlaps with at least part of an active area of a display screen of the display device 160. In one embodiment, the display driver 505 may receive digital display data from a timing controller 550 via a high-speed serial connection. The display driver 505 may then deserialize the data and use a plurality of digital-to-analog converters (DACs) to transmit respective analog voltages on the sources lines 315. In one embodiment, the display driver 505 may output a desired voltage on each of the subpixel data lines 315 simultaneously. The desired voltages may be unique or similar to the voltages being driven on other subpixels (i.e., the subpixels have the same color). The subpixel data lines 315 may then set the voltages across the pixels 305 to provide an image to the user. In general, the display driver 505 is configured to deliver a display updating signal on each of the sources lines 315 through a display driver connection pad 604 that is coupled to the portion of the sources lines 315 disposed within an internal region 613 of the integrated controllers 500. Typically, each connection pad 604 is in communication with a conductive trace (e.g., portion of a patterned transparent conductive oxide (TCO) or metal layer) formed on the TFT substrate 485 that is coupled to vias that connect each connection pad to the sources lines 315 in a separate routing layer (e.g., subpixel data line layer 415).

The integrated controllers 500 may also include transmitters 510 that include the transmitter module 205 (FIG. 2A) components, which is discussed above. The transmitters 510 may be drivers, which are part of the capacitive sensing circuitry, that generate the transmitter signals for capacitive sensing on one of the traces 335 through a touch sensing signal connection pad 602 that are coupled to the portion of the traces 335 that are disposed within the internal region 613 of the integrated controller 500. In turn, the traces 335 provide a signal path for the transmitter signal to reach one or more of the sensor electrodes 120. Typically, each connection pad 602 is in communication with a conductive trace (e.g., portion of a patterned TCO or metal layer) formed on the TFT substrate 485 that is coupled to vias that connect each connection pad 602 to the traces 335 in a separate routing layer (e.g., subpixel data line layer 415).

In one configuration, the receivers 515 include at least some of the components found in the receiver module 206, which is discussed above. To measure a capacitance associated with an electrode 120, the switching element 525 may electrically couple the traces 335 formed within the internal region 613 of the integrated controllers 500 to the receivers 515. In one example, a trace 335 may be coupled through the switch element 525 to a charge accumulator 276 (FIG. 2B) disposed within one of the receivers 515, so that an absolute sensing technique can be used to determine if an input object is proximate to the sensor electrode 120.

When performing transcapacitance sensing, a first conductive routing trace 335 may be coupled a transmitter 510 while a second conductive routing trace 335 is coupled a receiver 515. In one example, a switching element 525 is positioned to select receivers 515 that are coupled to one or more first sensor electrodes via at least the first conductive routing trace 335, and the first sensor electrodes are positioned adjacent to at least one second sensor electrode that is connected to the second conductive routing trace 335 that is coupled to a transmitter 510 via a switching element 525 to allow the performance of a transcapacitive touch sensing process. While the first conductive routing trace 335 provides the transmitter signal to one sensor electrode 120, the second conductive routing trace 335 provides the resulting signal indicative of the coupling capacitance between the two sensor electrodes 120 to the receiver 515. In this manner, the traces 335 may be used to both carry the modulated or transmitter signals from a transmitter 510 to a sensor electrode 120 as well as carry a resulting signal from the sensor electrode 120 to the receiver 515.

The receivers 515 may include an analog-to-digital converter (ADC) for converting the measured capacitance into a digital signal, as discussed above in conjunction with FIGS. 2B-2C. The integrated controller 500 may forward this data to a touch controller 560 located in the timing controller 550. In one embodiment, the integrated controller may serialize the digital data output from the respective ADCs and use a high-speed serial connection to transmit the data to the touch controller 560. Although not shown, the transmitters 510, receivers 515, and switching elements 525 may be controlled by signals received by the touch controller 560. That is, the touch controller 560 may include logic for driving the capacitive sensing components in the integrated controllers 500 to perform a capacitive sensing technique (e.g., absolute capacitive sensing, or transcapacitive sensing, or both).

The timing controller 550, which is part of the processing system 110, includes the touch controller 560 which uses the sensing data provided by the integrated controller 500 to determine a location of an input object in the sensing region. However, instead of using the timing controller 550 as a data processor, the sensing data may be transmitted to other processing elements in the processing system 110 of the integrated input device 400 (e.g., a CPU). Alternatively, the integrated controller 500 may include an integrated touch module for processing the sensing data rather than transmitting the sensing data to a separate data processing module (e.g., timing controller 550 or a CPU).

Integrated Controller Configurations

Figure 6A:
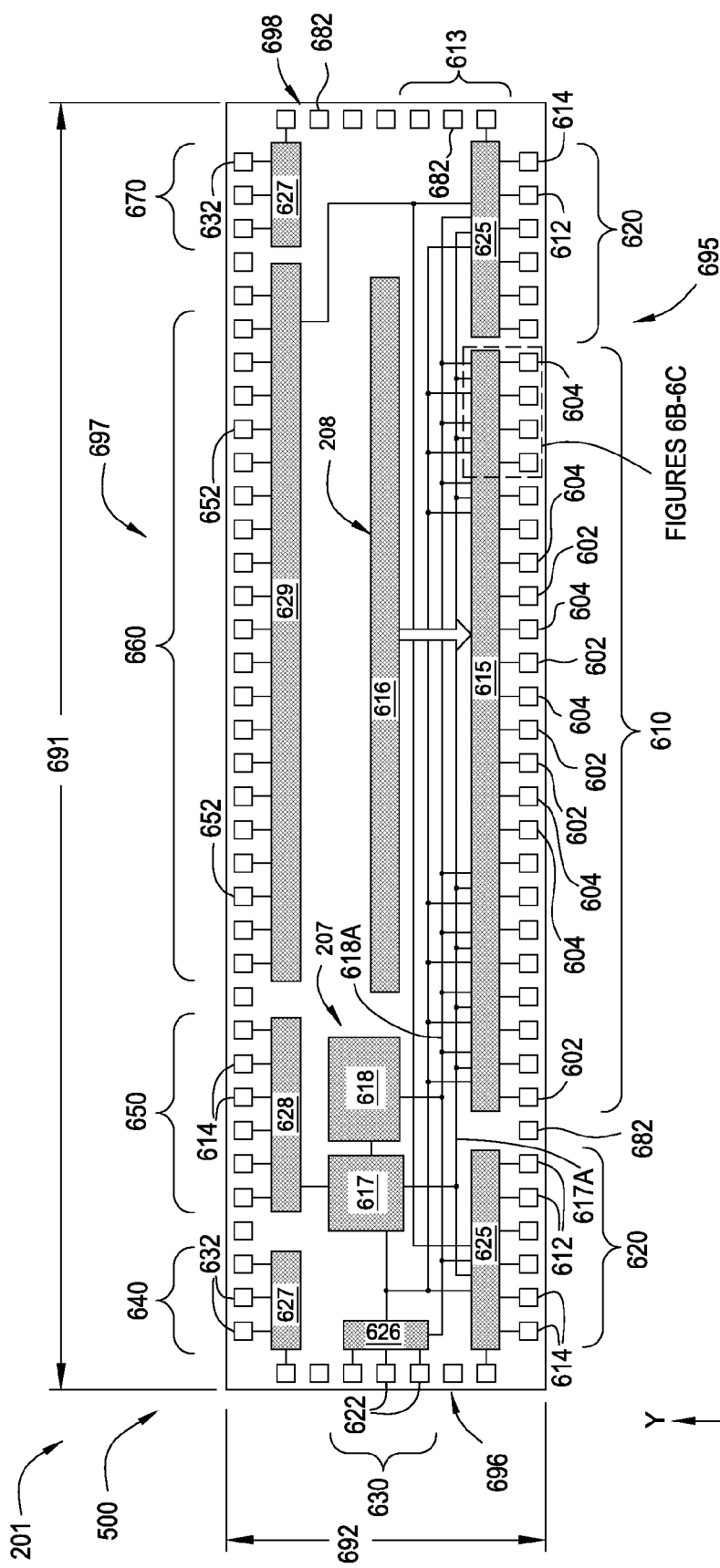
FIG. 6A is a schematic plan view of an integrated controller, according to one or more of the embodiments described herein.

FIG. 6A is a schematic plan view of the integrated controller 500 illustrating some of the major display circuitry, capacitive sensing circuitry and interconnection components according to an embodiment disclosed herein. In one configuration, the integrated controller 500 may include a source driver circuitry block 616 and a Vcom driver block 626 that are part of the display driver module 208 and an analog front end (AFE) block 617 and a touch controller block 618 that are part of the touch sensing module 207. In one embodiment, the AFE block 617 may include one or more components found within the receiver module 206 and/or one or more components found within the transmitter module 205. In one embodiment, the AFE block 617 comprises a plurality of receiver channels 275 (FIGS. 2B-2C) that are each disposed within a receiver 515, and are configured to receive a resulting signal and provide an output signal to the determination module 290 and/or electronic system 150. The touch controller block 618 generally includes circuit components that are configured to control and synchronize the various touch sensing components formed within the integrated controller 500, so that the touch sensing process can be performed. The touch controller block 618 may form part of the touch controller 560, which is described above. In some configurations, the touch controller 618 may include at least one or more circuit elements that are configured to control the switching elements 525 and/or multiplexers (MUXs) (not shown) that connect the AFE block 617 to multiple sensor electrodes 120 through the connection pads 602.

The source driver circuitry 616 and Vcom driver 626 generally includes circuit components that are configured to control and update the display within the integrated input device 400. In some configurations, the source driver circuitry 616 may include some or all of the components in the display device 300 discussed above in relation to FIG. 3.

In one configuration of the integrated controller 500, the exterior surface of the integrated controller 500 is formed in a parallelepiped shape or rectangular prism shape that has a first side 695, a second side 696, a third side 697, a fourth side 698, a top side 694 (FIG. 4B) and a bottom side 699 (FIG. 4B). In some configurations of the integrated controller 500, the first side 695 is opposite to the third side 697, the second side 696 is opposite to the fourth side 698, and a ratio of the lengths of the first side 695 to the second side 696 is greater than one. In this example, the length 691 of the first side 695 is greater than the length 692 of the second side 696.

The integrated controller 500 may also include a plurality of interconnecting elements that are provided to connect the various display circuitry and capacitive sensing circuitry elements to the other electrical components found within the integrated input device 400. The interconnecting elements, which are broadly described below as being a pad (e.g., pads 602, 604, 612, 614, 622, etc.), are the electrical connecting interfaces that are formed on one or more sides of the integrated controller 500 and are used to connect the internal portions of the routing traces within the internal region 613, which are formed between the various electrical components formed within the integrated controller 500, with the external portions 611 of the routing traces, which are connected to electrical elements that are external to the integrated controller 500 (e.g., sensor electrodes 120, display pixels 305, etc.). The interconnecting elements can be formed on any one of the sides of the integrated controller 500, such as on the bottom side 699 of the integrated controller 500. In one example, at least the pads 602 and 604 are disposed on the bottom side 699 of the integrated controller 500, which is adjacent to a surface of the third substrate 485 (FIG. 4B). The interconnecting elements may be electrically coupled to one or more conductive traces formed on the third substrate 485 using an anisotropic-conductive-film (ACF) layer (not shown). In some embodiments, the pads (e.g., pads 602, 604, 612, 614, 622, etc.) comprise a plurality of discrete metal regions that are spaced in a desired pattern along the surface of the integrated controller at pitch of about 10-70 µm.

The electronic components or elements within the integrated controller 500 may include a combined source driver and touch sensing interface 615, touch sensing interfaces 625, receiver channel interface 628, GLS signal interfaces 627, flexible interconnect signal interface 629 and other control interfaces. The touch sensing interfaces 625 each typically include an interface region 620 that includes at least one transmitter signal connection pad 612 that is coupled with the touch controller 618 and at least one receiver signal connection pad 614 that is coupled to the AFE block 617. The receiver channel interface 628 may include an interface region 650 that includes at least one receiver signal connection pad 614 that is coupled to the AFE block 617. The gate level-shifter signal (GLS) interfaces 627 may include an interface region 640 or 670 that each include at least one GLS signal connection pad 632 that is adapted to provide control signals to the TFT circuitry. In some configurations, the flexible interconnect signal interface 629, and other related control interfaces, may include an interface region 660 that includes one or more interconnection pads 652 and/or connection interface pads 682 that are configured to provide power, ground, and other useful communication signals required by the integrated controller 500 to perform the touch sensing and display updating tasks from one or more external components found within the processing system 110. The GLS signals provided by the GLS interfaces 627 generally control on-glass circuitry that is located along one or more edges of the glass (e.g., third substrate 485). In some configurations, the on-glass circuitry is located along the glass edges that are parallel to sides 696 and 698. Thus, the position of the GLS signal connection pad 632 may be constrained so that the GLS signal lines (not shown) do not cross over other signal lines (e.g., source driver and touch signals), for fear of generating electrical interference in these lines, that are also routed on the surface of the glass.

The combined source driver and touch sensing interface 615 typically includes an interface region 610 that includes at least one touch sensing signal connection pad 602 that is coupled to the AFE block 617 and/or touch controller block 618 and at least two display driver connection pads 604 that are coupled to the source driver circuitry 616. By use of one or more guarding techniques, which are discussed further below, the touch sensing signals and display driving signals can both be brought to at least one interface region 610 to allow a more compact routing of the conductive elements that are configured to deliver both touch sensing and display driving signals to perform the touch sensing and display driving processes. As noted above, conventional controllers had avoided interspersing the touch sensing signal connections with the display driver connections to prevent the electrical interaction of the signals and/or maintain the integrity of each of these types of signals flowing through the integrated controller 500. While it is typically desirable to keep the AFE block 617 components together in a contiguous region of the integrated controller 500 that is distant from the display driving circuit elements, by use of one or more of the processes or hardware configurations disclosed herein it is possible to position the AFE block 617 circuit components within a desired region of the integrated controller 500 and allow the conductive traces used to carry the touch sensing signals (e.g., driven touch sensing signal and/or resulting signals) delivered through a touch sensing signal connection pad 602 to come in close proximity or overlap with the conductive traces used to carry the display updating signals delivered through the display driver connection pads 604.

Therefore, in some embodiments, as illustrated in FIGS. 6B-6C the touch sensing signal connection pads 602 and display driver connection pads 604 are formed in an interleaved pattern on at least one side of the integrated controller, such as the bottom side 699 that is disposed on a surface of the third substrate 485. The interleaved pattern of touch sensing signal connection pads 602 and display driver connection pads 604 will allow the interconnection and more compact routing of the both touch sensing and display driving signals to their respective external circuit elements to perform the touch sensing and display driving processes.

FIG. 6B is top side plan view of a touch sensing signal connection pads 602 and display driver connection pads 604 layout formed on the bottom side of the integrated controller 500. In this configuration, the touch sensing signal connection pads 602 and display driver connection pads 604 are formed in two rows that are interleaved in the X-direction (e.g., touch sensing signal connection pads 602 and at least a portion of the traces 335 are disposed between display driver connection pads 604) and staggered in the Y-direction (e.g., rows of pads are spaced apart). It is noted that the rows of pads that are aligned in the X-direction may each contain one type of connection pad, as illustrated in FIG. 6B, or each row may contain both types of connection pads 602 and 604 as illustrated in FIG. 6C. However, to make sure that the most efficient use of the space is created within the combined source driver and touch sensing interface 615 the touch sensing signal connection pads 602 are interspersed between at least some of the display driver connection pads 604. The interleaved orientation of the touch sensing signal connection pads 602 and display driver connection pads 604 allow their respective connections to the subpixel data lines 315 and touch sensor traces 335, that are formed in a parallel orientation within a subpixel data line layer 415 of the third substrate 485. In one example, an integrated input device 400 includes a dual gate configuration (FIG. 3) within the display driver module 208, and thus the touch sensing signal connection pads 602 can be coupled with the sensor electrodes 120 via the traces 335 and display driver connection pads 604 can be coupled with the subpixel data lines 315. In a typical subpixel data line layer 415 found within a TFT device, the pitch of the subpixel data lines 315 (i.e., number of subpixel data lines per inch), and thus the number of required display driver connection pads 604, are typically 100 or more times greater than the typical number required for the touch sensing signal connection pads 602 that are connected to the sensor electrodes 120 in the integrated input device 400. Therefore, due to the reduction in the number of required subpixel data lines 315 in a dual gate type of integrated input device 400, the number of spaces, or unused lines, available in the subpixel data line layer 415 for the traces 335 is greater than what is typically required for even the new dual function touch sensing element designs. Thus, while FIGS. 6B-6C illustrate a one-to-one or two-to-one correlation between the display driver connection pads 604 to touch sensing signal connection pads 602 this configuration is not intended to be limiting as to the scope of the invention described herein. In general, the touch sensing signal connection pads 602 and display driver connection pads 604 in the combined source driver and touch sensing interface 615 that are interspersed, interleaved and/or staggered are arranged in an order, or a sequence, in at least one direction. In one example, following the order of the connection pads 602, 604 in the combined source driver and touch sensing interface 615 in the positive X-direction, as shown in FIG. 6B, the order of the pads will be pad 604/pad 602/pad 604/pad 602/ . . . /pad 604. As noted above, the order in at least one direction need not have a one-to-one relationship, and could have an order that includes a group having one or more first type of pads, one or more second type of pads and then one or more of the first type of pads in one or more repeating sequences of the group.

As schematically illustrated in FIGS. 6A-6B, the touch sensing signal connection pads 602 and display driver connection pads 604 are each coupled to interconnecting elements found in an interconnecting structure that is external to the integrated controller 500, such as the subpixel data lines 315 and traces 335 found in the external region 611 of the integrated input device 400. As illustrated in FIGS. 6A-6B, in one embodiment, the interconnecting elements (e.g., subpixel data lines 315, traces 335) have a regular pitch in the X-direction that has a pitch length 601. In this configuration, the touch sensing signal connection pads 602 and display driver connection pads 604 are arranged in the X-direction, such that at least one of the touch sensing signal connection pads 602 or display driver connection pads 604 are able to be connected to one of the interconnecting elements. Thus, the interspersed touch sensing signal connection pads 602 and display driver connection pads 604 are each spaced a pitch length apart from each other in the X-direction. While FIGS. 6A-6B schematically illustrate a configuration in which the touch sensing signal connection pads 602 and display driver connection pads 604 are directly connected to, or disposed over, the subpixel data lines 315 and traces 335 found in the subpixel data line layer 415 in the external region 611 of the integrated input device 400, this configuration is not intended to be limiting as to the scope of the invention described herein, since the interconnection structure to which the pads 602, 604 are directly connected need not be limited by the characteristics of the subpixel data line layer 415 conducting elements, but could also be configured to directly connect to a patterned layer of conductive material formed on a surface of the third substrate 485 which is coupled with the subpixel data lines 315 and traces 335, as discussed above in conjunction with FIG. 5. The patterned layer of conducting material, or conductive traces, may have a different interconnect pitch than the pitch of the subpixel data lines 315 and traces 335 formed in the subpixel data line layer 415.

FIG. 6C is a top side plan view of a touch sensing signal connection pads 602 and display driver connection pads 604 layout formed on the bottom side of the integrated controller 500. In this configuration, the touch sensing signal connection pads 602 and display driver connection pads 604 are formed in three rows that are interleaved in the X-direction and staggered in the Y-direction. As noted above, in this configuration, a touch sensing signal connection pad 602 is disposed between two display driver connection pads 604, due to the interleaved orientation of the pads. In one example, a touch sensing signal connection pad 602 is disposed between a display driver connection pad 604 and a contiguous plurality of display driver connection pads 604 (e.g., two adjacent display driver connection pads 604 are shown), as viewed in the X-direction. In some embodiments, the combined source driver and touch sensing interface 615 may contain two or more rows that contain touch sensing signal connection pads 602 and display driver connection pads 604. In one configuration, the combined source driver and touch sensing interface 615 contains two or more rows that contain touch sensing signal connection pads 602 and display driver connection pads 604 that are positioned in a staggered orientation to allow the interconnection between the display and capacitive sensing circuitry with the integrated controller 500 and the subpixel data lines and traces that are formed in parallel orientation within a layer of the third substrate 485.

Referring back to FIGS. 5 and 6A, due to the benefits typically gained by grouping portions of the capacitive sensing circuitry found in the touch sensing module 207 and/or display circuitry found in the driver module 208 it is common for the electrical lines, such as the subpixel data lines 315 and traces 335 within the internal region 613 of the integrated controller 500 to extend a long distance from the desired group of circuit elements to the desired connection interface. The need for long routing of the traces 335 in the internal region 313 is also common in integrated controller configurations that have multiplexers (MUXs) disposed between the AFE block 617 and the different connection pads 602 to allow portions of the touch sensing circuit found in the AFE block 617 to be used to receive and/or transmit touch sensing signals to different sensor electrodes 120 at different times during the touch sensing process. The electrical lines 617A that connect the AFE block 617 to the combined source driver and touch sensing interface 615, are thus forced to extend a large distance across the integrated controller 500, which makes them susceptible to electrical interference from other electrical components formed within the integrated controller 500. The electrical interference may be created due to the capacitive coupling $C_{TD}$ (e.g., capacitances $C_{TD1}$, $C_{TD2}$ . . . $C_{TDN}$) created between the subpixel data lines 315 and the traces 335 disposed within the internal region 613 of the integrated controller 500 and/or the capacitive coupling $C_{TS}$ (e.g., capacitances $C_{TS1}$, $C_{TS2}$ . . . $C_{TSN}$) created between the traces 335 and other electrical components 521 formed within the integrated controller 500. The electrical interference, can affect the capacitive sensing signal integrity and even the ability of the integrated controller 500 to sense the position of an input object 140 disposed over the sensing region 170, by affecting the signals flowing through the capacitive sensing and/or display driving circuits. Also, the long distances travelled by the electrical lines 617A will also increase the values of capacitance $C_{TD}$ and/or capacitance $C_{TS}$, which even in the absence of electrical interference will slow down the settling time of the touch sensing nodes during the touch sensing detection operation. The increase in the values of capacitance $C_{TD}$ and/or capacitance $C_{TS}$ also increases the total capacitance (background capacitance) of the receiver nodes, which may then affect and/or exceed the dynamic range of the receiver circuitry elements.

Guarding Signals

In an effort to minimize or eliminate the effect of electrical interference created within one or more the electrical circuits formed within the integrated controller 500, such as the capacitive sensing circuitry found in the touch sensing module 207, an electrical guarding technique can be used. As used herein, guarding refers to driving a varying voltage signal onto a first circuit element (e.g., trace, sensor electrode, etc.) that is substantially similar in amplitude and phase to the signal modulating a second driven circuit element to prevent capacitive coupling between the second circuit element and a third circuit elements. Whereas, shielding refers to maintaining a constant voltage onto a shielding type circuit element (e.g., trace, sensor electrode, etc.) to block or prevent a varying signal on a driven circuit element from affecting a signal flowing through a shielded circuit element (e.g., transmitter trace, transmitter electrode, receiver trace or receiver electrode). A simple form of shielding an electrical component is to couple the shielding type circuit element to ground. Electrically floating a circuit element is an alternate configuration in which the amount of charge or potential to ground on a passive circuit element that is "floated" varies passively as the overall profile of a driven signal applied to a driven circuit element varies, due to the capacitive coupling between the passive and driven circuit elements. In the electrical floating case, the amount of charge or potential to a reference level (e.g., ground) on a passive circuit element that is floated relative to a driven circuit element will vary as the profile of the driven signal and the amount of capacitive coupling formed between the passive and driven circuit elements varies, thus reducing the amount of electrical interference that will be induced within a first circuit element, when the passive circuit element is disposed between the passive circuit element and the driven circuit element.

Referring back to FIG. 5, in some configurations, the integrated controller 500 may include a guarding assembly 543 that may include one or more signal generators, such as signal generators 541 and 542, that are configured to provide a desired signal to the un-driven components in the capacitive sensing circuitry found in the touch sensing module 207 and/or display circuitry found in the driver module 208 at desired times within the touch sensing and display driving processes. The delivery of the desired signal will reduce the effects of any capacitance formed between the touch traces 335 and the touch sensing electrodes 120 with the other structures within the integrated input device 400. The desired signal will typically include providing a guarding signal to the capacitive sensing circuitry and/or display circuitry at desirable times based on commands sent from the touch controller 618, but may also include shielding or floating one or more components in the device at different times if desired. In some embodiments, the subpixel data lines and/or gate lines may be driven with a guarding signal to at least partially remove their parasitic capacitance effects. Further, common electrodes may also be driven with guarding signal so that their capacitances will not affect the sensor electrode that is being driven for capacitive sensing. Display electrodes that are not directly guarded may be electrically floated, so that they are indirectly guarded through their capacitances with adjacent guarded electrodes. In contrast, typical display devices may drive a DC voltage on the source and gate lines during the touch measurement interval. In contrast, driving guarding signals onto at least one of the display electrodes may be performed in order to remove one or more of the coupling capacitances. Further, all of the gate lines and/or subpixel data lines may also be driven with a guarding signal or electrically floated to reduce the parasitic capacitance effects between the gate lines and the sensor electrodes and the subpixel data lines and sensor electrodes.

The signal generators 541 and 542 may each be configured to deliver a square, rectangular, trapezoidal, sinusoidal, Gaussian or other shaped waveform that is configured to match a signal flowing through another component in the integrated controller 500 to reduce the capacitive coupling between these components. In one configuration, the signal generators 541 and 542 comprise an electrical device, or simple switch, that is able to deliver a signal at a desired output level.

The signal generator 542 is typically coupled to the display circuitry found in the driver module 208, and thus is typically connected to the display circuitry components found in the display driver 505. The signal generator 542 may receive commands from the touch controller 618 and then transmit respective analog voltages on the subpixel data lines 315 in the internal region 613 at a desired time within the display updating or touch sensing processes. In one embodiment, the signal generator 542 may output a desired voltage signal on each of the subpixel data lines 315 simultaneously.

The signal generator 541 is typically coupled to a portion of the capacitive sensing circuitry 543. The first component may be a subpixel data line 315 found in the internal region 613 of the integrated controller 500 and the second component may be one or more traces 335 found in the internal region 613 of the integrated controller 500. The signal generator 541 may receive commands from the touch controller 618 and then transmit respective analog voltages on the traces 335 at a desired time within the display updating or touch sensing processes. In one embodiment, the signal generator 541 may output a desired voltage signal on each of the otherwise undriven traces 335 simultaneously.

Figure 7A:
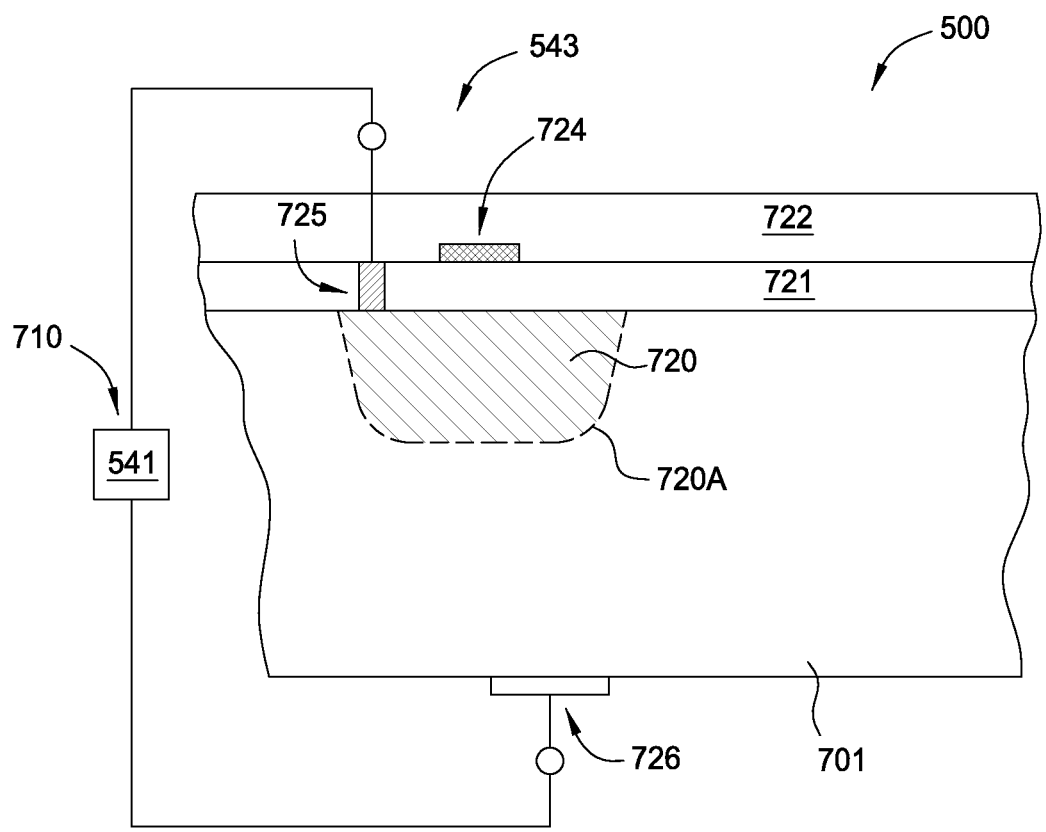
FIG. 7A is a schematic partial side cross-sectional view of a portion of an integrated controller, according to one embodiment described herein.
Figure 7B:
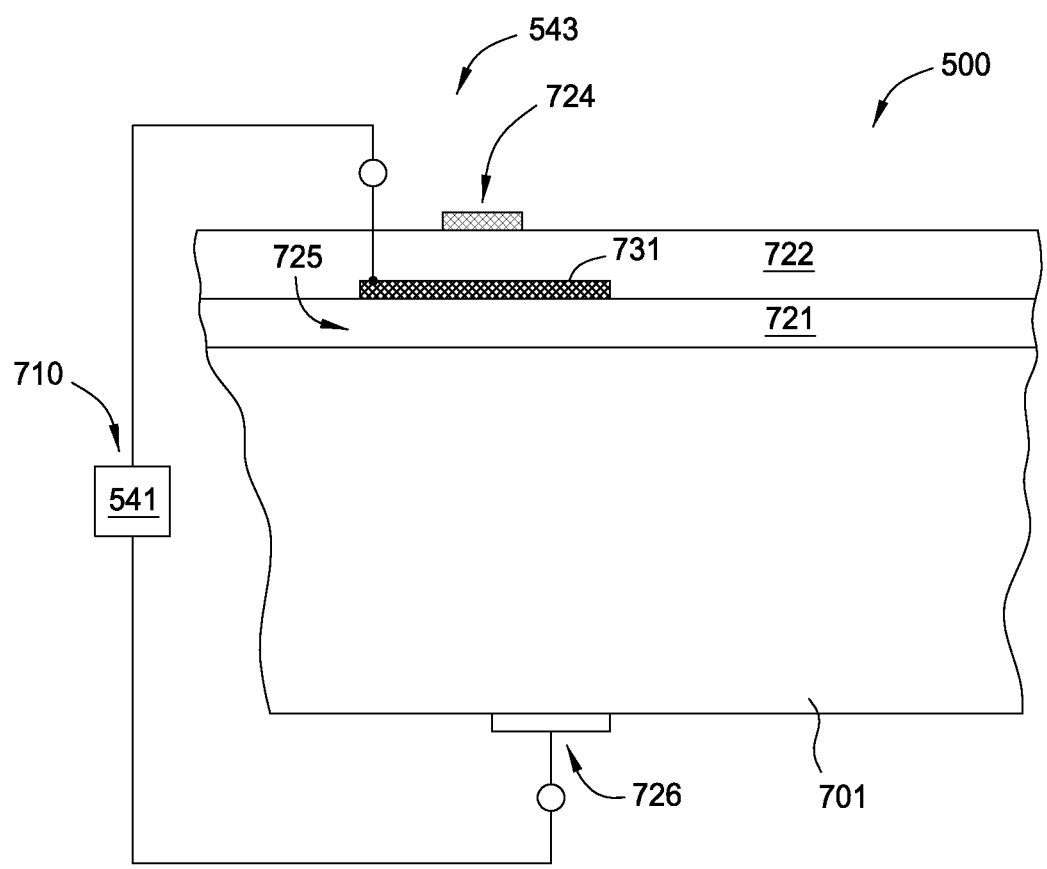
FIG. 7B is a schematic partial side cross-sectional view of a portion of an integrated controller, according to one embodiment described herein.

In another configuration, as illustrated in FIG. 5, the signal generator 541 is configured to deliver a guarding signal to a guarding structure 543 that is positioned to minimize the capacitive coupling between a first component and a second component that is to be guarded, shielded or floated. In this case, the signal generator 541 is configured to deliver a guarding signal to guarding structure 543 that is positioned to minimize or eliminate the capacitive coupling $C_{TS}$ formed between the routing found in the internal region 613 of the integrated controller 500. FIGS. 7A-7B illustrate examples of guarding structures 543 that are positioned relative to a signal conducting trace 724, which may be formed within one or more layers of the formed integrated controller.

FIG. 7A is a side cross-sectional view of a portion of the integrated controller 500 that has a signal conducting trace 724 that is positioned relative to a guarding structure 543, so that signals passing through the signal conducting trace 724 are not affected by the capacitive coupling formed between the signal conducting trace 724 and the other electrical components within the integrated controller 500. In one example, the signal conducting trace 724 may be a portion of a subpixel data line 315 or a trace 335 that is positioned between a first dielectric layer 721 and a second dielectric layer 722. The first and second dielectric layers 721, 722 may comprise a dielectric material that is disposed over a surface of the substrate 701, such as two silicon dioxide layers disposed over a silicon substrate.

In one configuration, the guarding structure 543 includes a biasing element 710 and a diffusion region 720, which is formed within a portion of the semiconductor substrate 701 of the integrated controller 500. The diffusion region 720 is typically doped with an element that has an opposite dopant type from which the substrate 701 is doped. For example, the diffusion region 720 may be more heavily doped with an n-type dopant if the substrate is doped with a p-type dopant or vice versa. The biasing element 710 includes the signal generator 541 that is configured to reverse bias the diffusion region 720 relative to the substrate 701 with a guarding signal, so that a depletion region 720A is formed during the biasing operation to reduce or eliminate the capacitive coupling between the signal conducting trace 724 and the substrate 701. During a guarding operation, when a driving signal having a varying voltage is provided to the signal conducting trace 724, a substantially similar signal that is in phase with the varying voltage, and having the same polarity and similar amplitude, is delivered to the diffusion region 720, via biasing a conducting element 725 (e.g., metal containing via) and diffusion region 720 relative to a substrate connection 726 using the signal generator 541.

FIG. 7B is a side cross-sectional view of a portion of the integrated controller 500 that has a signal conducting trace 724 that positioned near to an alternate type of guarding structure 543. In this configuration, the guarding structure 543 includes a conductive layer 731 and optionally biasing element 710. The conductive layer 731 typically includes a metal or TCO material that is positioned relative to a signal conducting trace 724 to minimize or reduce the effects of capacitive coupling to the signal conducting trace 724. During a guarding operation, when a driving signal that has a varying voltage is provided to the signal conducting trace 724, a substantially similar signal that is in phase with the varying voltage and having a similar polarity and amplitude is applied to the conductive layer 731 via biasing the conductive layer 731 relative to a substrate connection 726 using the signal generator 541. Since the guarding signal applied to the conductive layer 731 is similar in magnitude, polarity and timing to the signal delivered through the signal conducting trace 724, a capacitance of an undesirable size will not be formed between the signal conducting trace 724 and other external electrical components (e.g., substrate 701) if the conductive layer is disposed therebetween.

In a further embodiment, during a transcapacitive sensing process, a first sensor electrode may be driven with a transmitter signal while a resulting signal comprising effects corresponding to the transmitter signal is received with a second sensor electrode. Similar schemes as described above may be applied to display electrodes proximate the first sensor electrode and/or second sensor electrode.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. An integrated control system for use in an integrated input device comprising a display device integrated with a sensing device, the control system comprising:
   an integrated controller comprising:
      display circuitry coupled to a plurality of source driver output pads, wherein the source driver output pads are configured to transfer a display updating signal to a display within the input device; and
      capacitive sensing circuitry coupled to a plurality of capacitive sensing pads that are configured to transfer capacitive sensing signals during a capacitive sensing operation performed by the input device,
   wherein each of the plurality of capacitive sensing pads and the driver output pads are arranged in an order in a first direction, and the order includes at least one of the plurality of capacitive sensing pads that is disposed between two source driver output pads.

2. The integrated control system of claim 1, wherein the plurality of capacitive sensing pads are coupled to a portion of the capacitive sensing circuitry configured to drive the sensor electrodes for absolute capacitive sensing.

3. The integrated control system of claim 1, wherein the plurality of capacitive sensing pads are coupled to a portion of the capacitive sensing circuitry configured to drive a first sensor electrode for transcapacitive sensing.

4. The integrated control system of claim 1, wherein the plurality of capacitive sensing pads are coupled to a portion of the capacitive sensing circuitry, wherein each of the plurality of capacitive sensing pads are configured to receive a resulting signal from a sensor electrode.

5. The integrated control system of claim 1, wherein the at least one capacitive sensing pad comprises a first capacitive sensing pad that is coupled to a first portion of the capacitive sensing circuitry that is configured to drive a sensor electrode for transcapacitive sensing, and the integrated control system further comprises:
   at least one second capacitive sensing pad that is coupled to a second portion of the capacitive sensing circuitry that is configured to receive a resulting signal during a transcapacitive sensing process, wherein the at least one second capacitive sensing pad is not disposed between the first or the second source driver output pad.

6. The integrated control system of claim 1, wherein each of the capacitive sensing pads are selectively coupled to a sensor electrode, wherein at least a portion of the sensor electrodes are also used by the display circuitry to update the display.

7. The integrated control system of claim 1, wherein the capacitive sensing circuitry is further configured to deliver a guarding signal through the at least one of the plurality of capacitive sensing pads during the capacitive sensing operation performed by the input device.

8. The integrated control system of claim 1, wherein the capacitive sensing circuitry is further configured to either:
   deliver a shielding signal through the at least one of the plurality of capacitive sensing pads during the capacitive sensing operation performed by the input device, or
   electrically float the sensor electrode.

9. The integrated control system of claim 1, wherein the plurality of capacitive sensing pads are each selectively coupled to a receiver electrode trace that is coupled to a portion of the capacitive sensing circuitry used to receive a capacitive sensing signal.

10. The integrated control system of claim 9, wherein the integrated controller further comprises a diffusion region on which a first receiver electrode trace of a plurality of receiver electrode traces is disposed, wherein the diffusion region is configured to be driven with a guarding signal.

11. The integrated control system of claim 10, wherein the guarding signal comprises driving the diffusion region with a guarding signal that has a similar phase as the capacitive sensing signal.

12. The integrated control system of claim 1, wherein the plurality of capacitive sensing pads are each selectively coupled to a first transmitter electrode trace that is coupled to a portion of the capacitive sensing circuitry used to deliver a capacitive sensing signal to one or more of the plurality of capacitive sensing pads, and wherein the integrated controller further comprises a diffusion region on which a first transmitter electrode trace of a plurality of transmitter electrode traces is disposed, wherein the diffusion region is configured to be driven with a guarding signal.

13. The integrated control system of claim 1, wherein each of the capacitive sensing pads are coupled to at least one sensor electrode and the source driver output pads are each coupled to at least one display electrode, and the integrated controller is configured to:
   drive the capacitive sensing signal, which comprises a modulated signal, onto the at least one sensor electrode to acquire a change in capacitive coupling between an input object and the at least one sensor electrode during a first period, and
   operate the at least one display electrode in a guard mode to mitigate an effect of a coupling capacitance between the at least one sensor electrode and the at least one display electrode during the first period.

14. The integrated control system of claim 13, wherein operating the at least one display electrode in a guard mode comprises driving the at least one display electrode with a guarding signal that has a similar phase as the modulated signal.

15. The integrated control system of claim 1, wherein the capacitive sensing circuitry comprises a charge accumulator that is coupled to an electronic system.

16. The integrated control system of claim 1, wherein the integrated controller further comprises:
   a conductive trace that is coupled to one of the plurality of capacitive sensing pads; and
   a guarding structure comprising a conductive layer, wherein a dielectric layer is disposed between the conductive trace and the conductive layer; and
   a signal generator that is coupled to the conductive layer and is configured to drive the conductive layer with a guarding signal.

17. The integrated control system of claim 1, wherein the integrated controller further comprises:
   a conductive trace that is coupled to one of the plurality of capacitive sensing pads; and
   a guarding structure comprising a diffusion region formed in a region of a substrate, wherein a dielectric layer is disposed between the diffusion region and the conductive trace; and
   a signal generator that is coupled to the diffusion region and is configured to drive the conductive layer with a guarding signal.

18. An input device comprising:
   a plurality of sensor electrodes disposed in an array on a surface of a first layer of an integrated input device; and
   an integrated controller coupled to the plurality of sensor electrodes via a plurality of conductive routing wires in a second layer of the integrated input device, the integrated controller further comprising:
      a display circuitry coupled to a plurality of source driver output pads, wherein the source driver output pads are coupled to display updating components within the integrated input device via a plurality of conductive routing wires in the second layer; and
      a capacitive sensing circuitry coupled to a plurality of capacitive sensing pads that are configured to transfer capacitive sensing signals to the plurality of sensor electrodes during a capacitive sensing operation performed by the input device,
   wherein each of the plurality of capacitive sensing pads and the plurality of source driver output pads are arranged in an order in a first direction, and the order includes at least one of the plurality of capacitive sensing pads that is disposed between two source driver output pads.

19. The input device of claim 18, wherein the capacitive sensing pads are:
   selectively coupled to a portion of the capacitive sensing circuitry configured to drive a sensor electrode for transcapacitive sensing, and/or
   selectively coupled to a portion of the capacitive sensing circuitry configured to drive the sensor electrode for absolute capacitive sensing.

20. The input device of claim 18, wherein the capacitive sensing pads are each coupled to at least one sensor electrode and the source driver output pads are each coupled to at least one display pixel electrode, and the integrated controller is configured to:
   drive a modulated signal onto the at least one sensor electrode to acquire a change in capacitive coupling between an input object and the at least one sensor electrode during a first period, and
   operate the at least one display electrode in a guard mode to mitigate an effect of a coupling capacitance between the at least one sensor electrode and the at least one display electrode during the first period.

21. The input device of claim 18, wherein the at least one capacitive sensing pad comprises a first capacitive sensing pad that is coupled to a first portion of the capacitive sensing circuitry that is configured to drive a sensor electrode for transcapacitive sensing, and the integrated control system further comprises:
   at least one second capacitive sensing pad that is coupled to a second portion of the capacitive sensing circuitry that is configured to receive a resulting signal during a transcapacitive sensing process, wherein the at least one second capacitive sensing pad is not disposed between the two source driver output pads.

* * * * *

UNITED STATES PATENT AND TRADEMARK OFFICE
CERTIFICATE OF CORRECTION

PATENT NO. : 9,298,299 B2
APPLICATION NO. : 14/219996
DATED : March 29, 2016
INVENTOR(S) : Christopher A. Ludden It is certified that error appears in the above-identified patent and that said Letters Patent is hereby corrected as shown below:

In Claim 5, delete "or the second source driver output pad" and insert -- and the second source driver output pads --, therefor.

Signed and Sealed this
First Day of January, 2019

Andrei Iancu
*Director of the United States Patent and Trademark Office*